(12) United States Patent  
Hirai

(10) Patent No.: US 12,119,181 B2
(45) Date of Patent: Oct. 15, 2024

(54) MULTILAYER CERAMIC ELECTRONIC COMPONENT

(71) Applicant: Murata Manufacturing Co., Ltd., Nagaokakyo (JP)

(72) Inventor: Tomoaki Hirai, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 230 days.

(21) Appl. No.: 17/837,128

(22) Filed: Jun. 10, 2022

(65) Prior Publication Data

US 2022/0406527 A1 Dec. 22, 2022

(30) Foreign Application Priority Data

Jun. 16, 2021 (JP) .................................. 2021-100423

(51) Int. Cl.
*H01G 4/232* (2006.01)
*H01G 4/012* (2006.01)
*H01G 4/12* (2006.01)
*H01G 4/30* (2006.01)

(52) U.S. Cl.
CPC ............ *H01G 4/232* (2013.01); *H01G 4/012* (2013.01); *H01G 4/1227* (2013.01); *H01G 4/30* (2013.01)

(58) Field of Classification Search
CPC .......... H01G 4/30; H01G 4/005; H01G 4/008; H01G 4/012; H01G 4/232

USPC ................ 361/301.4, 321.1, 303, 311, 321.4
See application file for complete search history.

(56) References Cited

U.S. PATENT DOCUMENTS

| 2003/0190462 A1* | 10/2003 | Nakamura | ........... H01G 4/1227 |
| | | | 428/304.4 |
| 2010/0079925 A1* | 4/2010 | Togashi | .................... H01G 4/30 |
| | | | 361/306.3 |
| 2016/0093443 A1* | 3/2016 | Hirao | ..................... H01G 4/232 |
| | | | 427/79 |

FOREIGN PATENT DOCUMENTS

JP 2006269985 A * 10/2006
JP 2018-046086 A 3/2018

* cited by examiner

*Primary Examiner* — Arun Ramaswamy
(74) *Attorney, Agent, or Firm* — Keating & Bennett, LLP

(57) ABSTRACT

A multilayer ceramic electronic component includes a multilayer body including stacked ceramic layers, internal conductive layers stacked on the ceramic layers, and external electrodes each connected to the internal conductive layers. The internal conductive layers each include holes each having different shapes and area equivalent diameters. When an area equivalent diameter in which a cumulative value in a cumulative distribution of area equivalent diameters of the holes existing in each of the internal conductive layers is about 90% is defined as an area equivalent diameter D90, an average value of circularity of the holes in a first population including holes each having the area equivalent diameter D90 or more is about 0.7 or less.

19 Claims, 20 Drawing Sheets

MULTILAYER CERAMIC ELECTRONIC COMPONENT

CROSS REFERENCE TO RELATED APPLICATIONS

This application claims the benefit of priority to Japanese Patent Application No. 2021-100423 filed on Jun. 16, 2021. The entire contents of this application are hereby incorporated herein by reference.

BACKGROUND OF THE INVENTION

1. Field of the Invention

The present invention relates to a multilayer ceramic electronic component.

2. Description of the Related Art

Conventionally, multilayer ceramic capacitors have been known. Generally, the multilayer ceramic capacitors each include a multilayer body including dielectric layers and internal electrode layers which are alternately laminated therein. For example, Japanese Unexamined Patent Application Publication No. 2018-46086 discloses a multilayer ceramic capacitor including a multilayer body including dielectric layers and internal electrode layers which are alternately laminated therein, and a plurality of auxiliary electrodes.

The multilayer ceramic capacitor disclosed in Japanese Unexamined Patent Application Publication No. 2018-46086 includes the plurality of auxiliary electrodes. This reduces or prevents electric field concentration and thus improves product reliability. However, Japanese Unexamined Patent Application Publication No. 2018-46086 does not take into consideration that the holes in the internal electrode layers affect the reliability of the multilayer ceramic capacitor.

SUMMARY OF THE INVENTION

Preferred embodiments of the present invention provide multilayer ceramic electronic components that are each able to reduce or prevent electric field concentration.

A multilayer ceramic electronic component according to a preferred embodiment of the present invention includes a multilayer ceramic electronic component including a multilayer body including a plurality of stacked ceramic layers, a plurality of internal conductive layers stacked on the ceramic layers, a first main surface and a second main surface opposing each other in a height direction, a first side surface and a second side surface opposing each other in a width direction perpendicular or substantially perpendicular to the height direction, and a first end surface and a second end surface opposing each other in a length direction perpendicular or substantially perpendicular to the height direction and the width direction, and external electrodes each connected to the internal conductive layers, in which the internal conductive layers each include a plurality of holes each having a different shape and a different area equivalent diameter, when an area equivalent diameter in which a cumulative value in a cumulative distribution of area equivalent diameters of the plurality of holes existing in each of the internal conductive layers is about 90% is defined as an area equivalent diameter D90, an average value of circularity of the plurality of holes in a first population including holes each having the area equivalent diameter D90 or more is about 0.7 or less.

According to preferred embodiments of the present invention, it is possible to provide multilayer ceramic electronic components that are each able to reduce or prevent electric field concentration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
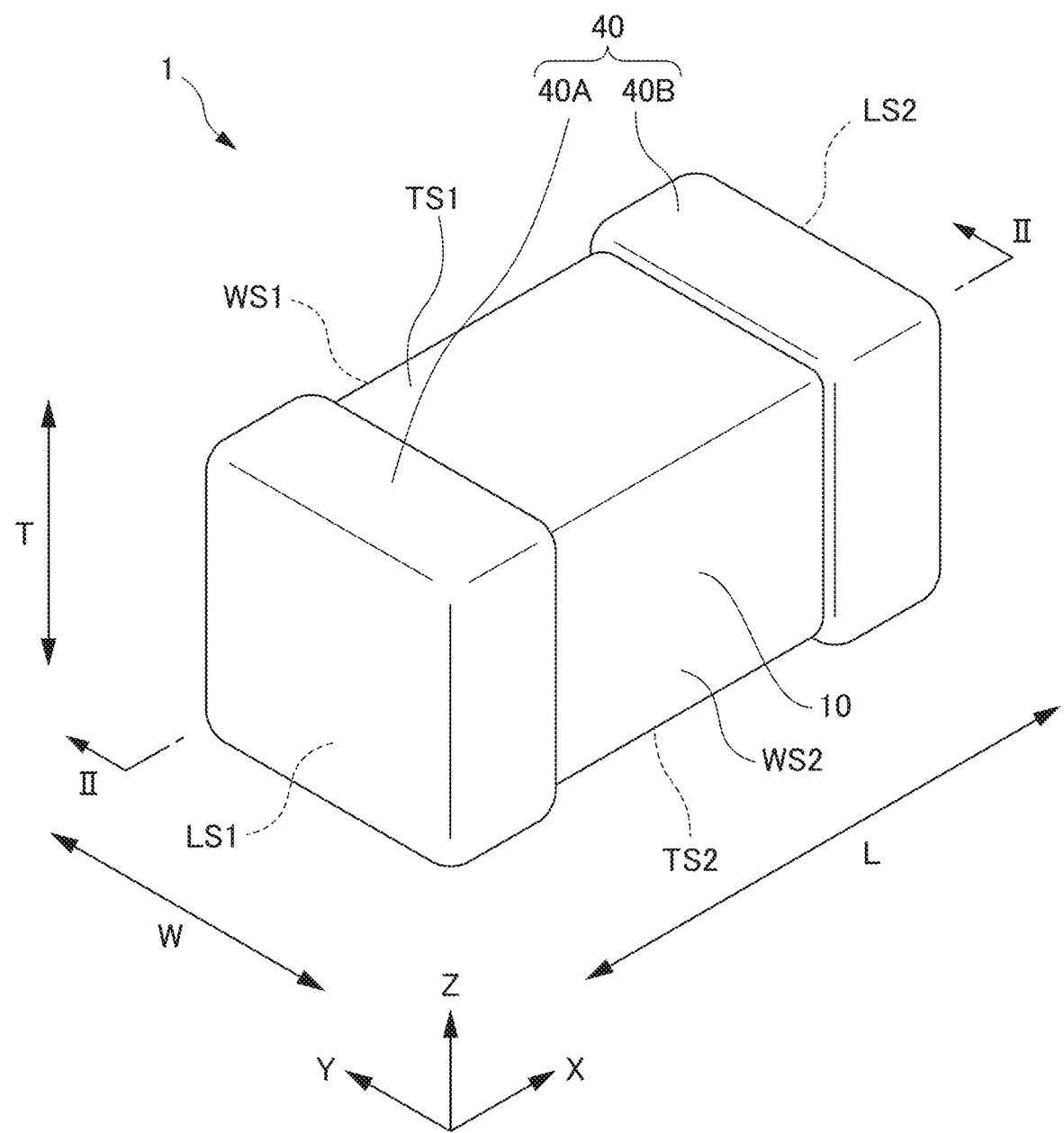
FIG. 1 is an external perspective view of a multilayer ceramic capacitor according to a preferred embodiment of the present invention.
Figure 2:
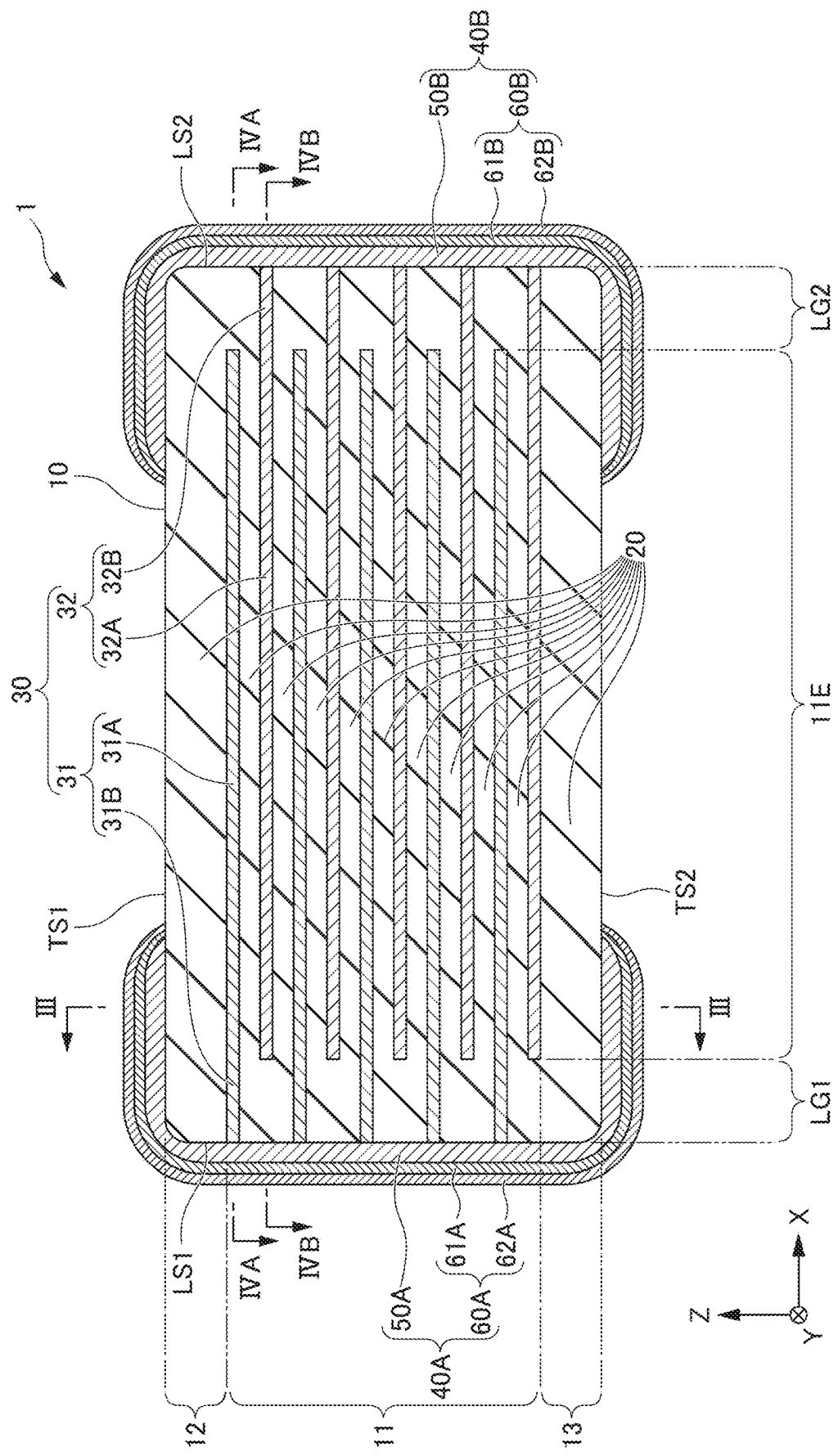
FIG. 2 is a cross-sectional view taken along the line II-II of the multilayer ceramic capacitor shown in FIG. 1.
Figure 3:
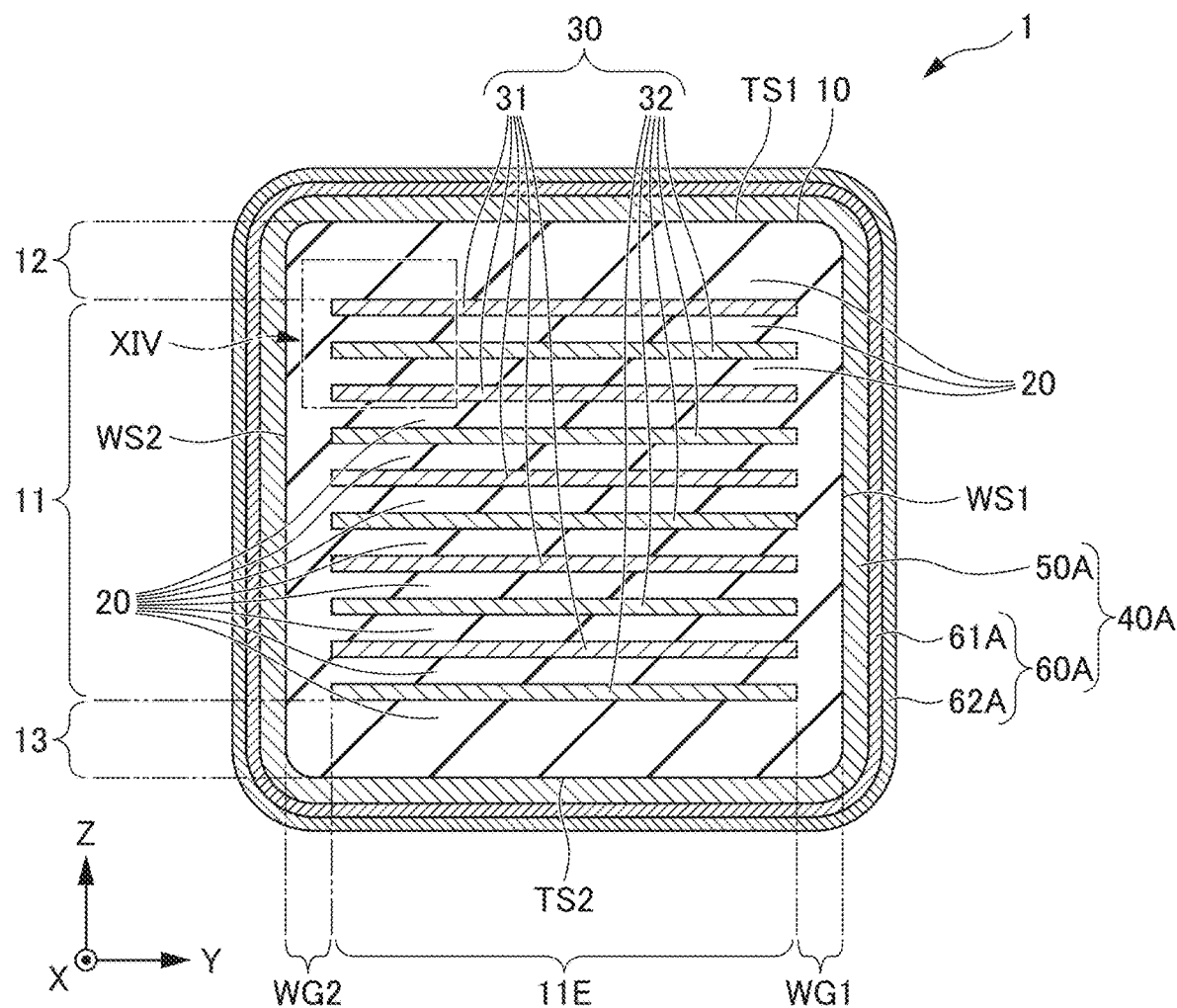
FIG. 3 is a cross-sectional view taken along the line III-III of the multilayer ceramic capacitor shown in FIG. 2.
Figure 4A:
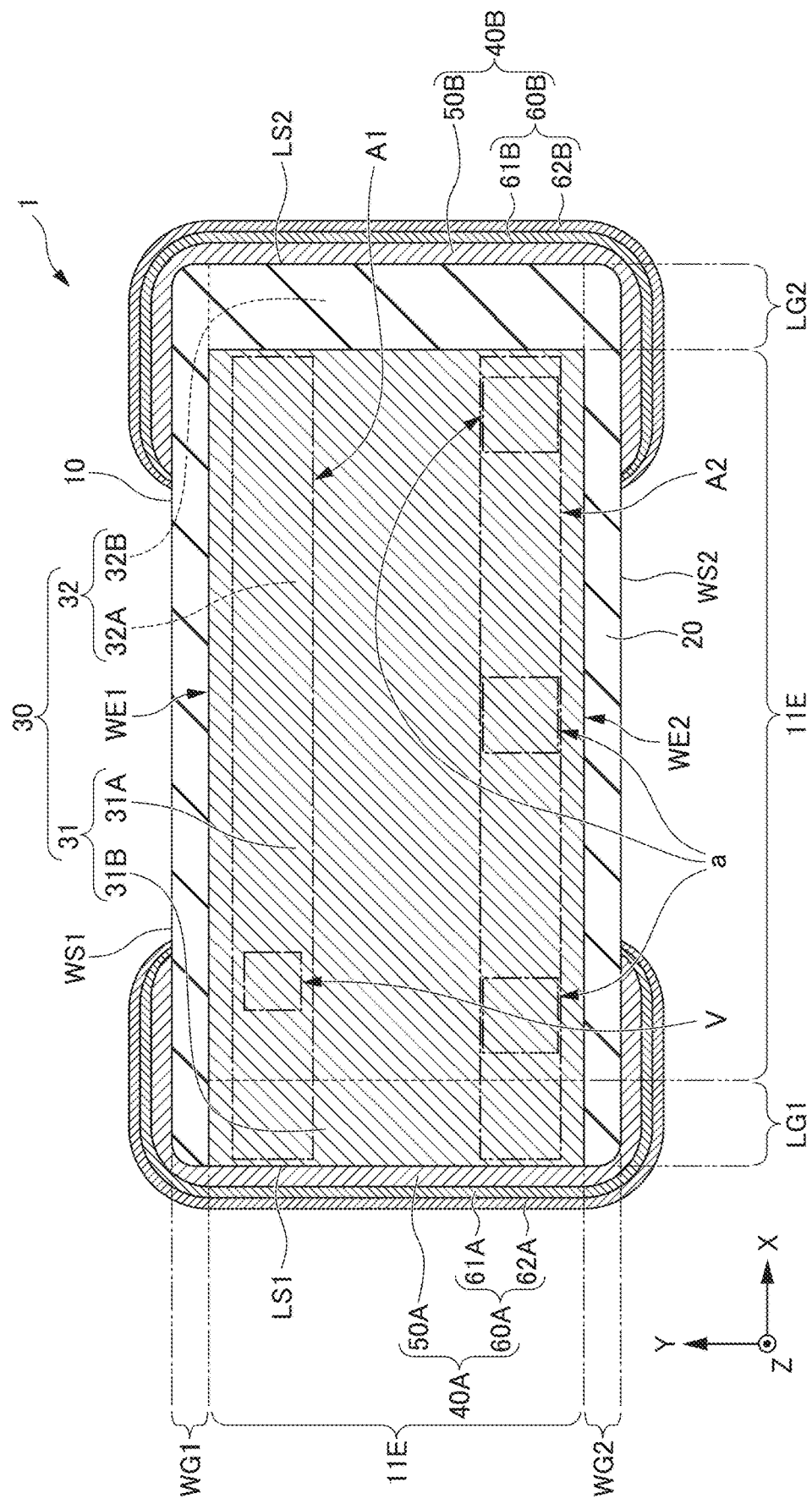
FIG. 4A is a cross-sectional view taken along the line IVA-IVA of the multilayer ceramic capacitor shown in FIG. 2.
Figure 4B:
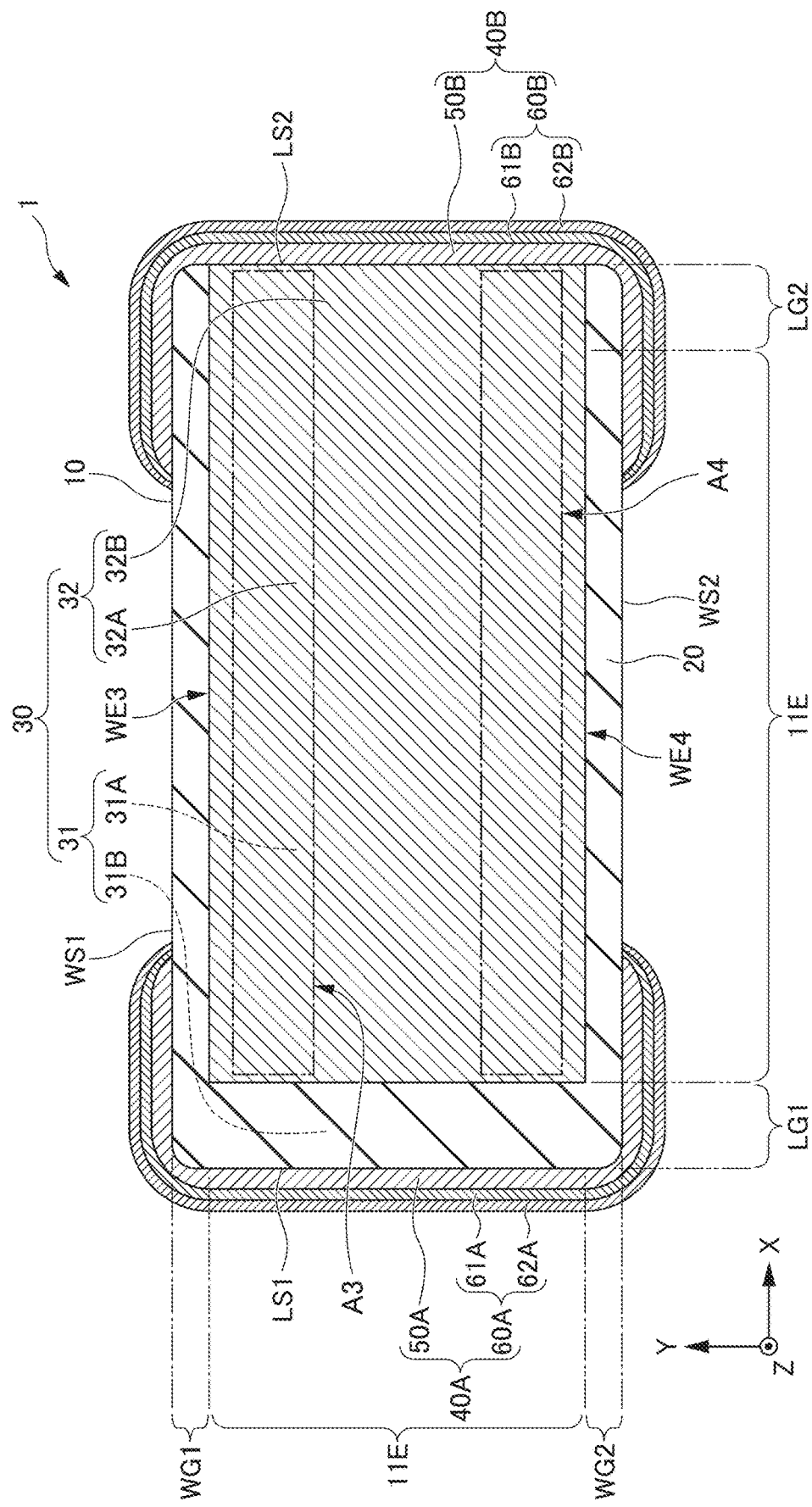
FIG. 4B is a cross-sectional view taken along the line IVB-IVB of the multilayer ceramic capacitor shown in FIG. 2.

Hereinafter, a multilayer ceramic capacitor 1 defining and functioning as a multilayer ceramic electric component according to a preferred embodiment of the present invention will be described. FIG. 1 is an external perspective view of a multilayer ceramic capacitor 1 according to a preferred embodiment of the present invention. FIG. 2 is a cross-sectional view taken along the line II-II of the multilayer ceramic capacitor 1 shown in FIG. 1. FIG. 3 is a cross-sectional view taken along the line of the multilayer ceramic capacitor 1 shown in FIG. 2. FIG. 4A is a cross-sectional view taken along the line IVA-IVA of the multilayer ceramic capacitor 1 shown in FIG. 2. FIG. 4B is a cross-sectional view taken along the line IVB-IVB of the multilayer ceramic capacitor 1 shown in FIG. 2.

The multilayer ceramic capacitor 1 includes a multilayer body 10 and external electrodes 40.

The XYZ Cartesian coordinate system is shown in FIGS. 1 to 4B. A length direction L of the multilayer ceramic capacitor 1 and the multilayer body 10 corresponds to the X direction. A width direction W of the multilayer ceramic capacitor 1 and the multilayer body 10 corresponds to the Y direction. A height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIGS. 4A and 4B is also referred to as an LW cross section.

As shown in FIGS. 1 to 4B, the multilayer body 10 includes a first main surface TS1 and a second main surface TS2 opposing each other in the height direction T, a first side surface WS1 and a second side surface WS2 opposing each other in the width direction W perpendicular or substantially perpendicular to the height direction T, and a first end surface LS1 and a second end surface LS2 opposing each other in the length direction L perpendicular or substantially perpendicular to the height direction T and the width direction W.

As shown in FIG. 1, the multilayer body 10 has a rectangular or substantially rectangular parallelepiped shape. The dimension of the multilayer body 10 in the length direction L is not necessarily longer than the dimension of the width direction W. The corners and ridges of the multilayer body 10 are preferably rounded. The corners are portions where the three surfaces of the multilayer body intersect, and the ridges are portions where the two surfaces of the multilayer body intersect. Unevenness or the like may be provided on a portion or the entirety of the surface of the multilayer body 10.

The dimension of the multilayer body 10 is not particularly limited. However, when the dimension in the length direction L of the multilayer body 10 is defined as an L dimension, the L dimension is preferably about 0.2 mm or more and about 6 mm or less, for example. Furthermore, when the dimension in the height direction T of the multilayer body 10 is defined as a T dimension, the T dimension is preferably about 0.05 mm or more and about 5 mm or less, for example. Furthermore, when the dimension in the width direction W of the multilayer body 10 is defined as a W dimension, the W dimension is preferably about 0.1 mm or more and about 5 mm or less, for example.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30. The plurality of dielectric layers 20 define and function as a plurality of ceramic layers. The plurality of internal electrode layers 30 define and function as a plurality of internal conductive layers. The inner layer portion 11 includes, in the height direction T, from the internal electrode layer 30 located closest to the first main surface TS1 to the internal electrode layer 30 located closest to the second main surface TS2. In the inner layer portion 11, a plurality of internal electrode layers 30 are opposed to each other with the dielectric layer 20 interposed therebetween. The inner layer portion 11 generates a capacitance and substantially defines and functions as a capacitor.

The plurality of dielectric layers 20 are each made of a dielectric material. The dielectric material may be a dielectric ceramic including a component such as $BaTiO_3$, $CaTiO_3$, $SrTiO_3$, or $CaZrO_3$, for example. Furthermore, the dielectric material may be obtained by adding a secondary component such as, for example, a Mn compound, an Fe compound, a Cr compound, a Co compound, or a Ni compound to the main component. The dielectric material particularly preferably includes, for example, $BaTiO_3$ as a main component.

The thicknesses of the dielectric layers 20 are each preferably about 0.2 μm or more and about 10 μm or less, for example. The number of the dielectric layers 20 to be laminated (stacked) is preferably fifteen or more and 1200 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 each include a first internal electrode layer 31 and a second internal electrode layer 32. The plurality of internal electrode layers 30 define and function as internal conductive layers 30. The plurality of first internal electrode layers 31 define and function as first internal conductive layers 31. The plurality of second internal electrode layers 32 define and function as second internal conductive layers 32. The plurality of first internal electrode layers 31 are each provided on the dielectric layer 20. The plurality of second internal electrode layers 32 are each provided on the dielectric layer 20. The plurality of first internal electrode layers 31 and the plurality of second internal electrode layers 32 are alternately provided in the height direction T of the multilayer body 10 with the dielectric layers 20 interposed therebetween. The first internal electrode layers 31 and the second internal electrode layers 32 each sandwich the dielectric layers 20.

The first internal electrode layer 31 includes a first opposing portion 31A which is opposed to the second internal electrode layer 32, and a first extension portion 31B extending from the first opposing portion 31A toward the first end surface LS1. The first extension portion 31B is exposed at the first end surface LS1.

The second internal electrode layer 32 includes a second opposing portion 32A which is opposed to the first internal electrode layer 31, and a second extension portion 32B extending from the second opposing portion 32A toward the second end surface LS2. The second extension portion 32B is exposed at the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited. However, they are preferably rectangular or substantially rectangular. The corners of the rectangular or substantially rectangular shape may be rounded, or the corners of the rectangular or substantially rectangular shape may be provided obliquely. The shapes of the first extension portion 31B and the second extension portion 32B are not particularly limited. However, they are preferably rectangular or substantially rectangular. The corners of the rectangular or substantially rectangular shape may be rounded, or the corners of the rectangular or substantially rectangular shape may be provided obliquely.

The dimension in the width direction W of the first opposing portion 31A may be the same or substantially same as the dimension in the width direction W of the first extension portion 31B, or either of them may be smaller. The dimension in the width direction W of the second opposing portion 32A may be the same or substantially same as the dimension in the width direction W of the second extension portion 32B, or either of them may be smaller.

As shown in FIG. 4A, the first internal electrode layer 31 includes a first side WE1 in the vicinity of the first side surface WS1, and a second side WE2 in the vicinity of the second side WS2. As shown in FIG. 4B, the second internal electrode layer 32 includes a third side WE3 in the vicinity of the first side surface WS1 and a fourth side WE4 in the vicinity of the second side surface WS2.

The first internal electrode layer 31 and the second internal electrode layer 32 are each made of an appropriate electrically conductive material including a metal such as, for example, Ni, Cu, Ag, Pd, and Au, and an alloy including at least one of these metals. When using an alloy, the first internal electrode layer 31 and the second internal electrode layer 32 may be made of, for example, a Ag—Pd alloy or the like.

The thickness of each of the first internal electrode layers 31 and the second internal electrode layers 32 is preferably, for example, about 0.2 µm or more and about 2.0 µm or less. The total number of the first internal electrode layers 31 and the second internal electrode layers 32 is preferably fifteen or more and 1000 or less, for example.

The first main surface-side outer layer portion 12 is located in the vicinity of the first main surface TS1 of the multilayer body 10. The first main surface-side outer layer portion 12 is an assembly of a plurality of dielectric layers 20 located between the first main surface TS1 and the internal electrode layer 30 closest to the first main surface TS1. The dielectric layers 20 used in the first main surface-side outer layer portion 12 may be the same or substantially same as the dielectric layers 20 used in the inner layer portion 11.

The second main surface-side outer layer portion 13 is located in the vicinity of the second main surface TS2 of the multilayer body 10. The second main surface-side outer layer portion 13 includes a plurality of dielectric layers 20 located between the second main surface TS2 and the internal electrode layer 30 closest to the second main surface TS2. The dielectric layers 20 used in the second main surface-side outer layer portion 13 may be the same or substantially same as the dielectric layers 20 used in the inner layer portion 11.

As described above, the multilayer body 10 includes the plurality of laminated dielectric layers 20 and the plurality of laminated internal electrode layers 30 on the dielectric layers. In other words, the multilayer ceramic capacitor 1 includes the multilayer body 10 including the dielectric layers 20 and the internal electrode layers 30 which are alternately laminated therein.

The multilayer body 10 includes an opposing electrode portion 11E. The opposing electrode portion 11E refers to a portion where the first opposing portion 31A of the first internal electrode layer 31 and the second opposing portion 32A of the second internal electrode layer 32 are opposed to each other. The opposing electrode portion 11E defines and functions as a portion of the inner layer portion 11. FIG. 4A and FIG. 4B each show the range of the opposing electrode portion 11E in the width direction W and in the length direction L. The opposing electrode portion 11E is also referred to as a capacitor active portion.

The multilayer body 10 includes side surface-side outer layer portions. The side surface-side outer layer portions include a first side surface-side outer layer portion WG1 and a second side surface-side outer layer portion WG2. The first side surface-side outer layer portion WG1 is a portion including the dielectric layer 20 located between the opposing electrode portion 11E and the first side surface WS1. The second side surface-side outer layer portion WG2 is a portion including the dielectric layer 20 located between the opposing electrode portion 11E and the second side surface WS2. FIGS. 3, 4A, and 4B each show the ranges of the first side surface-side outer layer portion WG1 and the second side surface-side outer layer portion WG2 in the width direction W. The side surface-side outer layer portions are also each referred to as a W gap or a side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layer 20 located between the opposing electrode portion 11E and the first end surface LS1. The second end surface-side outer layer portion LG2 is a portion including the dielectric layer 20 located between the opposing electrode portion 11E and the second end surface LS2. FIGS. 2, 4A, and 4B each show the ranges in the length directions L of the first end surface side outer layer portion LG1 and the second end surface side outer layer portion LG2. The end surface-side outer layer portion is also each referred to as an L gap or an end gap.

The external electrodes 40 include a first external electrode 40A provided in the vicinity of the first end surface LS1 and a second external electrode 40B provided in the vicinity of the second end surface LS2.

The first external electrode 40A is provided on the first end surface LS1. The first external electrode 40A is connected to the first internal electrode layer 31. The first external electrode 40A may be provided on a portion of the first main surface TS1 and a portion of the second main surface TS2, and also on a portion of the first side surface WS1 and a portion of the second side surface WS2. In the present preferred embodiment, the first external electrode 40A extends from the first end surface LS1 to a portion of the first main surface TS1 and to a portion of the second main surface TS2, and to a portion of the first side surface WS1 and to a portion of the second side surface WS2.

The second external electrode 40B is provided on the second end surface LS2. The second external electrode 40B is connected to the second internal electrode layers 32. The second external electrodes 40B may be provided on a portion of the first main surface TS1 and a portion of the second main surface TS2, and also on a portion of the first side surface WS1 and a portion of the second side surface WS2. In the present preferred embodiment, the second external electrode 40B extends from the second end surface LS2 to a portion of the first main surface TS1 and to a portion of the second main surface TS2, and to a portion of the first side surface WS1 and a portion of the second side surface WS2.

As described above, in the multilayer body 10, the capacitance is generated by the first opposing portions 31A of the first internal electrode layers 31 and the second opposing portions 32A of the second internal electrode layers 32 opposing each other with the dielectric layers 20 interposed therebetween. Therefore, characteristics of the capacitor are provided between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layers 31. In the present preferred embodiment, the first base electrode layer 50A extends from the first end surface LS1 to a portion of the first main surface TS1 and to a portion of the second main surface TS2, and to a portion of the first side surface WS1 and to a portion of the second side surface WS2.

The second base electrode layer 50B is provided on the second end surface LS2. The second base electrode layer 50B is connected to the second internal electrode layers 32. In the present preferred embodiment, the second base electrode layer 50B extends from the second end surface LS2 to a portion of the first main surface TS1 and to a portion of the second main surface TS2, and to a portion of the first side surface WS1 and to a portion of the second side surface WS2.

The first base electrode layer 50A and the second base electrode layer 50B of the present preferred embodiment are, for example, fired layers. It is preferable that the fired layers each include both of a metal component, and either a glass component or a ceramic component, or both the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. As the ceramic component, the same or substantially same ceramic material as that of the dielectric layer 20 may be used, or a different ceramic material may be used. Ceramic components include, for example, at least one selected from $BaTiO_3$, $CaTiO_3$, (Ba, Ca)$TiO_3$, $SrTiO_3$, $CaZrO_3$, and the like.

The fired layer is obtained by, for example, applying an electrically conductive paste including glass and metal to a multilayer body and firing it. The fired layer may be obtained by simultaneously firing a laminate chip including the internal electrodes and the dielectric layers and an electrically conductive paste applied to the laminate chip, or obtained by firing the laminate chip including the internal electrodes and the dielectric layers to obtain a multilayer body, following which the multilayer body is coated with an electrically conductive paste, and subjected to firing. In a case of simultaneously firing the laminate chip including the internal electrodes and the dielectric layers, it is preferable that the fired layer is formed by firing a material to which a ceramic material instead of glass component is added. In this case, it is particularly preferable to use, as the ceramic material to be added, the same or substantially same type of ceramic material as the dielectric layer 20. Furthermore, the fired layer may include a plurality of layers.

The thickness in the length direction of the first base electrode layer 50A located in the vicinity of the first end surface LS1 is preferably, for example, about 3 μm or more and about 200 μm or less at the middle portion in the height direction T and the width direction W of the first base electrode layer 50A.

The thickness in the length direction s of the second base electrode layer 50B located in the vicinity of the second end surface LS2 is preferably, for example, about 3 μm or more and about 200 μm or less at the middle portion of the height direction T and the width direction W of the second base electrode layer 50B.

When providing the first base electrode layer 50A to at least one of portions of the first main surface TS1 and the second main surface TS2, the thickness in the height direction of the first base electrode layer 50A provided at this portion is preferably about 3 μm or more and about 25 μm or less at the middle portion in the length direction L and the width direction W of the first base electrode layer 50A provided at this portion, for example.

When providing the first base electrode layer 50A to at least one of portions of the first side surface WS1 and the second side surface WS2, the thickness in the width direction of the first base electrode layer 50A provided at this portion is preferably about 3 μm or more and about 25 μm or less at the middle portion in the length direction L and the height direction T of the first base electrode layer 50A provided at this portion, for example.

When providing the second base electrode layer 50B to at least one of portions of the first main surface TS1 and the second main surface TS2, the thickness in the height direction of the second base electrode layer 50B provided at this portion is preferably about 3 μm or more and about 25 μm or less at the middle portion in the length direction L and the width direction W of the second base electrode layer 50B provided at this portion, for example.

When providing the second base electrode layer 50B to at least one of portions of the first side surface WS1 and the second side surface WS2, the thickness in the width direction of the second base electrode layer 50B provided at this portion is preferably about 3 μm or more and about 25 μm or less at the middle portion in the length direction L and the height direction T of the second base electrode layer 50B provided at this portion, for example.

The first base electrode layer 50A and the second base electrode layer 50B are not limited to the fired layers. The first base electrode layer 50A and the second base electrode layer 50B may include at least one selected from a fired layer, an electrically conductive resin layer, a thin film layer, or other layers. For example, the first base electrode layer 50A and the second base electrode layer 50B each may be a thin film layer. The thin film layer may be formed by a thin film forming method such as a sputtering method or a deposition method, for example. The thin film layer may be a layer of about 10 μm or less on which metal particles are deposited.

The first plated layer 60A covers the first base electrode layer 50A.

The second plated layer 60B covers the second base electrode layer 50B.

The first plated layer 60A and the second plated layer 60B may each include at least one selected from Cu, Ni, Sn, Ag, Pd, a Ag—Pd alloy, Au, and the like, for example. The first plated layer 60A and the second plated layer 60B may each include a plurality of layers. The first plated layer 60A and the second plated layer 60B each preferably include, for example, a two-layer structure including a Sn plated layer on a Ni plated layer.

The first plated layer 60A covers the first base electrode layer 50A. In the present preferred embodiment, the first plated layer 60A includes a first Ni plated layer 61A, and a first Sn plated layer 62A provided on the first Ni plated layer 61A.

The second plated layer 60B covers the second base electrode layer 50B. In the present preferred embodiment, the second plated layer 60B includes a second Ni plated layer 61B, and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. The thickness of each of the Ni first plated layer 61A, the first Sn plated layer 62A, the second Ni plated layer 61B, and the second Sn plated layer 62B is preferably, for example, about 2 μm or more and about 10 μm or less.

The first external electrode 40A and the second external electrode 40B of the present preferred embodiment may each include an electrically conductive resin layer including electrically conductive particles and a thermosetting resin, for example. When the electrically conductive resin layer is provided as the first base electrode layer 50A and the second base electrode layer 50B, the electrically conductive resin layer may cover the fired layer, or may be provided directly on the multilayer body 10 without providing the fired layer. If the electrically conductive resin layer covers the fired layer, the electrically conductive resin layer is disposed between the fired layer and the plated layer, or between the first plated layer 60A and the second plated layer 60B. The electrically conductive resin layer may completely cover the fired layer or may cover a portion of the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys including them. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the electrically conductive particle.

Furthermore, the electrically conductive particle may be a metal powder coated on the surface of the metal powder with Ag, for example. When using those coated with Ag on the surface of the metal powder, the metal powder is preferably, for example, Cu, Ni, Sn, Bi, or an alloy powder thereof. In order to make the metal of the base material inexpensive while keeping the characteristics of Ag, it is preferable to use a metal powder coated with Ag, for example.

Furthermore, the electrically conductive particle may be formed by, for example, subjecting Cu and Ni to an oxidation prevention treatment. Furthermore, the electrically conductive particle may be a metal powder coated with Sn, Ni, and Cu on the surface of the metal powder, for example. When using those coated with Sn, Ni, and Cu on the surface of the metal powder, the metal powder is preferably, for example, Ag, Cu, Ni, Sn, Bi, or an alloy powder thereof.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly ensure the conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one selected from a variety of known thermosetting resins such as epoxy resin, phenolic resin, urethane resin, silicone resin, polyimide resin, and the like. Among those, epoxy resin is excellent in heat resistance, moisture resistance, adhesion, etc., and thus is one of the more preferable resins. Furthermore, it is preferable that the resin of the electrically conductive resin layer includes a curing agent together with a thermosetting resin. When epoxy resin is used as a base resin, the curing agent for the epoxy resin may be various known compounds such as phenols, amines, acid anhydrides, imidazoles, active esters, and amide-imides, for example.

The electrically conductive resin layer may include a plurality of layers. The thickest portion of the electrically conductive resin layer is preferably, for example, about 10 μm or more and about 150 μm or less.

The first plated layer 60A and the second plated layer 60B may be provided directly on the multilayer body 10 without providing the first base electrode layer 50A and the second base electrode layer 50B. That is, the multilayer ceramic capacitor 1 may include the plated layer that is directly electrically connected to the first internal electrode layer 31 and the second internal electrode layer 32. In such a case, the plated layer may be provided after the catalyst is disposed on the surface of the multilayer body 10 as a pretreatment.

Also in this case, the plated layer preferably includes a plurality of layers. The lower plated layer and the upper plated layer preferably include, respectively, at least one metal selected from Cu, Ni, Sn, Pb, Au, Ag, Pd, Bi or Zn, for example, or an alloy containing these metals, for example. It is more preferable that the lower plated layer is provided using Ni with solder barrier performance. It is more preferable that the upper plated layer is provided using, for example, Sn or Au with favorable solder wettability. For example, when the first internal electrode layer 31 and the second internal electrode layer 32 are provided using Ni, it is preferable that the lower plated layer is provided using Cu with a good bonding property with Ni. The upper plated layer may be provided as necessary. The external electrode 40 may include only the lower plated layer. The plated layer may include the upper plated layer as an outermost layer. Furthermore, another plated layer may be provided on the surface of the upper plated layer.

The thickness per layer of the plated layer without the base electrode layer is preferably, for example, about 2 μm or more and about 10 μm or less. The plated layer preferably does not include glass. The metal ratio per unit volume of the plated layer is preferably, for example, about 99% by volume or more.

When the plated layer is provided directly on the multilayer body 10, it is possible to reduce the thickness of the base electrode layer. Therefore, it is possible to reduce the dimension in the height direction T of the multilayer ceramic capacitor 1 by the amount obtained by reducing the thickness of the base electrode layer. As a result, it is possible to reduce the height of the multilayer ceramic capacitor 1. Alternatively, it is possible to increase the thickness of the dielectric layer 20 sandwiched between the first internal electrode layer 31 and the second internal electrode layer 32 by the amount corresponding to a reduction in the thickness of the base electrode layer. As a result, it is possible to improve the thickness of the element body. Thus, by providing the plated layer directly on the multilayer body 10, it is possible to improve the design freedom of the multilayer ceramic capacitor.

When the dimension in the length direction of the multilayer ceramic capacitor 1 including the multilayer body 10 and the external electrodes 40 is defined as the L dimension, the L dimension is preferably, for example, about 0.2 mm or more and about 6 mm or less. Furthermore, when the dimension in the height direction of the multilayer ceramic capacitor 1 is defined as the T dimension, the T dimension is preferably, for example, about 0.05 mm or more and about 5 mm or less. Furthermore, when the dimension in the width direction of the multilayer ceramic capacitor 1 is defined as the W dimension, the W dimension is preferably, for example, about 0.1 mm or more and about 5 mm or less.

Here, the inventor of preferred embodiments of the present invention repeatedly conducted investigation, experiments, and simulations, and have obtained knowledge it being preferable to make the holes of the internal electrode layer into an appropriate state in order to improve the reliability of the multilayer ceramic capacitors. This will be described below.

Conventionally, in order to increase the reliability of a multilayer ceramic capacitor, various techniques are assumed. For example, Japanese Unexamined Patent Application Publication No. 2018-46086 discloses a multilayer ceramic capacitor including a multilayer body in which a plurality of dielectric layers and a plurality of internal electrode layers are alternately stacked, and a plurality of auxiliary electrodes. In the multilayer ceramic capacitor of Japanese Unexamined Patent Application Publication No. 2018-46086, providing a plurality of auxiliary electrodes reduces or prevents electric field concentration, such that the reliability of the article is enhanced. However, the multilayer ceramic capacitor of Japanese Unexamined Patent Application Publication No. 2018-46086 includes a plurality of auxiliary electrodes, and thus it is difficult to ensure the area of the capacitor effective portion that generates the capacitance. Therefore, it is difficult to increase the reliability while reducing or preventing a decrease in capacitance.

In consideration of the above, the inventor of preferred embodiments of the present invention has intensively examined the structure of the internal electrode layers capable of enhancing the reliability. As a result, the inventor of preferred embodiments of the present application has discovered that, according to the configuration of the present preferred embodiment, it is possible to reduce or prevent the electric field concentration and to improve the reliability of the products while reducing or preventing the lowering of the electrostatic capacitance. More specifically, the inventor of preferred embodiments of the present invention has discovered that the location where the holes in the internal electrode layer are present is burned as a starting point at the time of electrical breakdown occurrence of the multilayer ceramic capacitor. Then, the inventor of preferred embodiments of the present invention has discovered that it is possible to reduce or prevent electric field concentration by adjusting in particular the shapes of holes having large area equivalent diameters among the plurality of holes existing in the internal electrode layers. Hereinafter, the internal electrode layer 30 of the present preferred embodiment will be described in detail.

Figure 5:
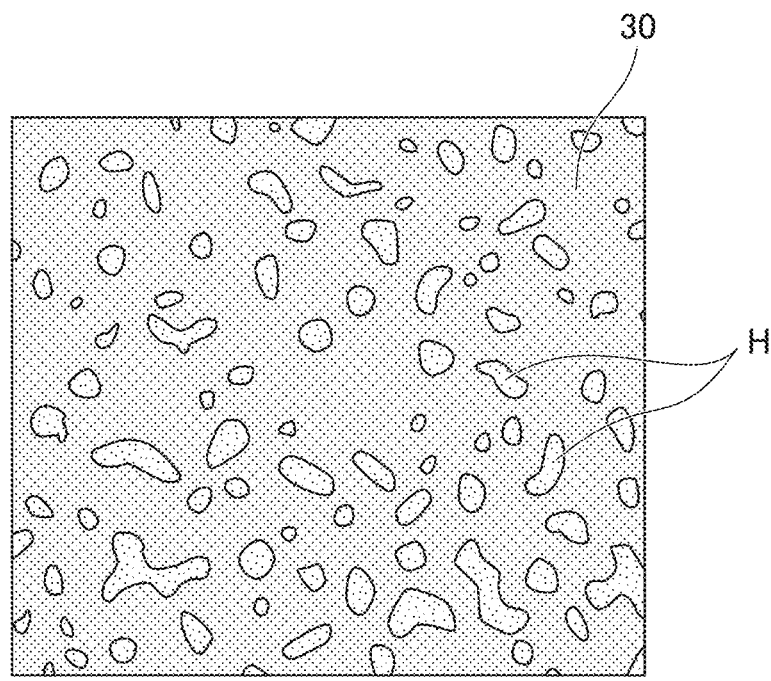
FIG. 5 is an enlarged view of a V portion of the multilayer ceramic capacitor 1 shown in FIG. 4A.

FIG. 5 is an enlarged view of the V portion of the multilayer ceramic capacitor 1 shown in FIG. 4A. FIG. 5 is a diagram exemplarily showing a state of the first internal electrode layer 31 as the internal electrode layer 30. More specifically, FIG. 5 is a view of the internal electrode layer 30 in the WT cross section of the multilayer ceramic capacitor 1 of the present preferred embodiment, when viewed in the height direction T connecting the first main surface TS1 and the second main surface TS2, i.e., in a plan view. The coating state of the first internal electrode layer 31 with respect to the dielectric layer 20, and the coating state of the second internal electrode layer 32 with respect to the dielectric layer 20 when viewed in the height direction T connecting the first main surface TS1 and the second main surface TS2, are basically the same or substantially same state. Therefore, in the following description, the first internal electrode layer 31 and the second internal electrode layer 32 are collectively described as the internal electrode layer 30 as necessary.

FIG. 5 is a diagram of the internal electrode layer 30 in the vicinity of the first side WE1 as a side of the internal electrode layer 30. As shown in FIG. 5, the internal electrode layer 30 includes a plurality of holes H having different shapes and different area equivalent diameters. The thickness of the internal electrode layer 30 shown in FIG. 5 is, for example, about 0.6 μm, and the coverage of the internal electrode layer with respect to the dielectric layer 20 is, for example, about 82%. The inside of each of the holes H of the internal electrode layer 30 may be a void, or a glass component such as a dielectric or silica may be present therein, for example. When the inside of each of the holes H of the internal electrode layer 30 is a void, the dielectric layer 20 is visible through the hole H.

Figure 6:
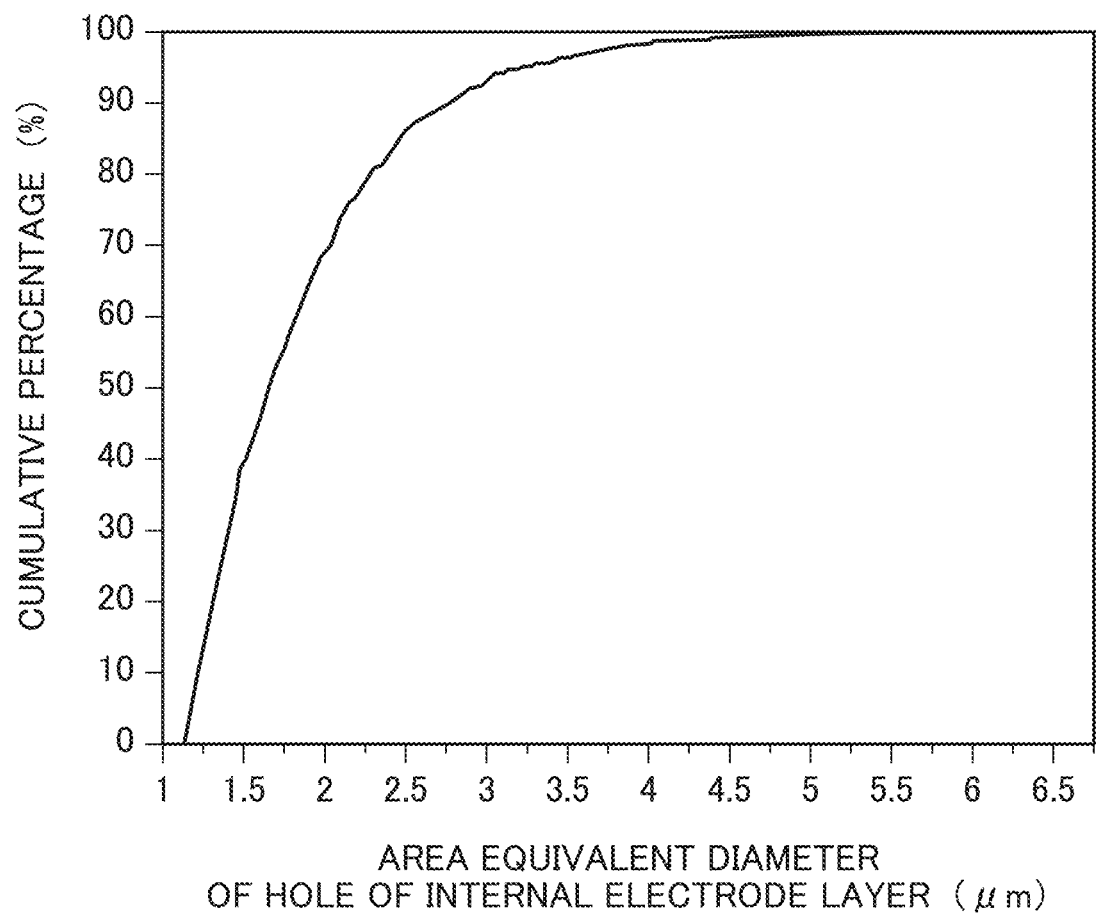
FIG. 6 is a diagram of area equivalent diameter distribution data of a plurality of holes existing in an internal electrode layer.

FIG. 6 is a diagram showing area equivalent diameter distribution data of the plurality of holes H existing in the internal electrode layer 30. FIG. 6 shows the cumulative percentage with respect to the area equivalent diameter. The horizontal axis of FIG. 6 represents the area equivalent diameters of the holes H. The vertical axis of FIG. 6 represents the cumulative percentage showing the value obtained by dividing the number of holes H below its area equivalent diameter (the cumulative value of the number of holes) by the total number (the number of holes of a population). That is, the area equivalent diameter distribution data shown in FIG. 6 refers to the area equivalent diameter distribution data of the number reference. The data in FIG. 6 is the area equivalent diameter distribution data in the measurement target region in the vicinity of the side of the internal electrode layer 30. In other words, the data of FIG. 6 is data when holes existing in a region wider than the region shown in FIG. 5 are used as a population.

In the multilayer ceramic capacitor 1 of the present preferred embodiment, when the area equivalent diameter in which the cumulative value in the cumulative distribution of the area equivalent diameters of the plurality of holes H existing in the internal electrode layer 30 becomes, for example, about 99% is defined as the area equivalent diameter D99, the area equivalent diameter D99 is preferably about 8.0 μm or less, for example. In the example of the area equivalent diameter distribution data shown in FIG. 6, the area equivalent diameter D99 is about 4.4 μm, for example.

Furthermore, when the area equivalent diameter in which the cumulative value in the cumulative distribution of the area equivalent diameters of the plurality of holes H existing in the internal electrode layer 30 becomes about 90% is defined as the area equivalent diameter D90, the area equivalent diameter D90 is preferably about 4.0 μm or less, for example. For example, in the area equivalent diameter distribution data of FIG. 6, the area equivalent diameter D90 is about 2.8 μm, for example. Thus, it is possible to reduce or prevent the electric field concentration, and increase the reliability of the products.

The area equivalent diameter refers to the value of the diameter of a perfect or substantially perfect circle with an area equal to the area of the hole defined by the hole profile. For example, when the area of the hole defined by the profile of the hole is about 50 μm$^2$, the area equivalent diameter is about 8.0 μm.

As described above, the area equivalent diameter D99 refers to the area equivalent diameter in which the cumulative value in the cumulative distribution of the area equivalent diameters of the plurality of holes becomes about 99%, for example. That is, a value such that the ratio of the holes of the area equivalent diameters below this is about 99% is referred to as the area equivalent diameter D99. The area equivalent diameter D90 refers to the area equivalent diameter in which the cumulative value in the cumulative distribution of the area equivalent diameters of the plurality of holes becomes about 90%. That is, a value such that the ratio of the holes of the area equivalent diameters below this is about 90% is referred to as the area equivalent diameter D90. The area equivalent diameter D50 is also called a median diameter. The area equivalent diameter D50 refers to the area equivalent diameter in which the cumulative value in the cumulative distribution of the area equivalent diameters of the plurality of holes becomes about 50%. That is, a value such that the ratio of the holes of the area equivalent diameters below this is about 50% is referred to as the area equivalent diameter D50. In other words, the area equivalent diameter D50 refers to the area equivalent diameter such that, when dividing a plurality of holes H into two categories based on a certain area equivalent diameter as a reference, the number of holes larger than the reference and the number of holes smaller than the reference become the same.

Furthermore, in the present preferred embodiment, the average value of the circularity of the plurality of holes in the first population of the holes having the area equivalent diameter D90 or more is set to about 0.7 or less, for example. That is, the shapes of the holes having larger area equivalent diameter are irregular.

Here, circularity is defined as the amount of deviation of a circular object from a geometrically correct circle. The circularity of a hole as a measurement target is calculated by the following expression (1) based on the area and circumference length of the hole as defined by the hole profile.

$$\text{Circularity} = \text{about } 4\pi \times (\text{Area}) / (\text{Circumference length})^2 \quad (1)$$

Next, a description will be provided of how the above-described advantageous effects can be obtained using simulation.

First Simulation

Figure 7A:
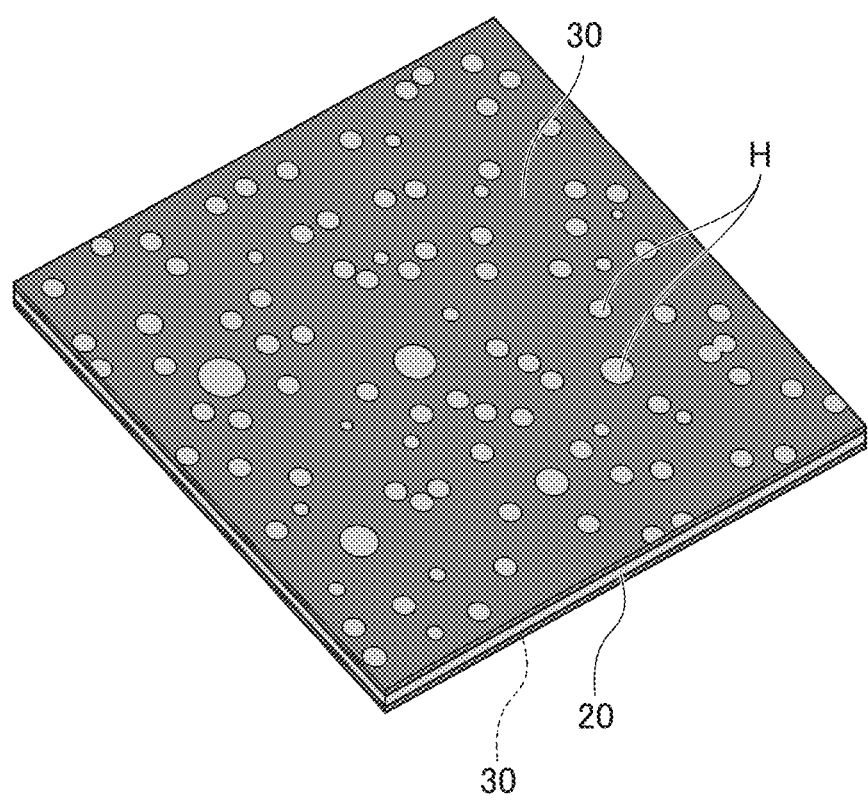
FIG. 7A is a diagram of a model of the internal electrode layer used in a first simulation.

FIG. 7A is a model of the internal electrode layer 30 used in the first simulation. In this model, the internal electrode layer 30 is provided on the dielectric layer 20. Furthermore, in this model, as shown in FIG. 7A, the plurality of holes H are provided randomly. Furthermore, the area equivalent diameters of the plurality of holes H include variations. In this model, the plurality of holes H are provided in a perfect or substantially perfect circle. In this model, the internal electrode layer 30 is provided in which a plurality of holes H are provided randomly also on the back side of the dielectric layer 20, similarly to the surface side.

In the first simulation, a plurality of holes H are set in the internal electrode layer 30 so that the area equivalent diameter D99 is about 8.0 μm, for example. Furthermore, for example, the thickness of the internal electrode layer 30 is set to about 0.6 μm, the coverage of the internal electrode layer 30 with respect to the dielectric layer 20 is set to about 88%, the thickness of the dielectric layer 20 is set to about 2.0 μm, and the applied voltage is set to about 37.5 V. In the simulation, a voltage is applied between the internal electrode layer 30 of the front surface side and the internal electrode layer 30 of the back surface side sandwiching the dielectric layer 20.

Figure 7B:
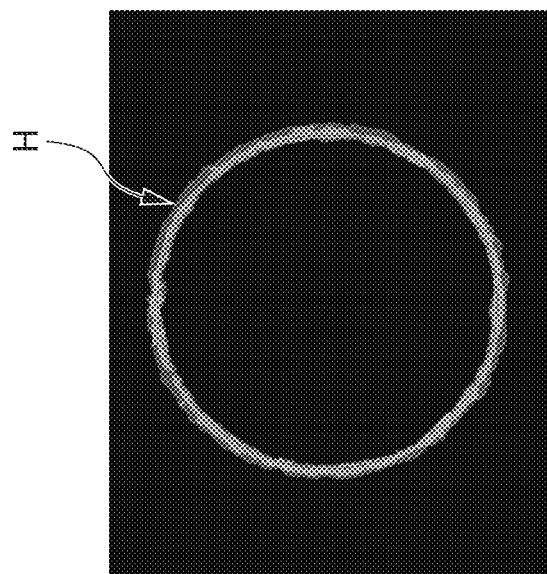
FIG. 7B is a diagram of an electric field strength distribution in the vicinity of the holes in the internal electrode layer.
Figure 7B:
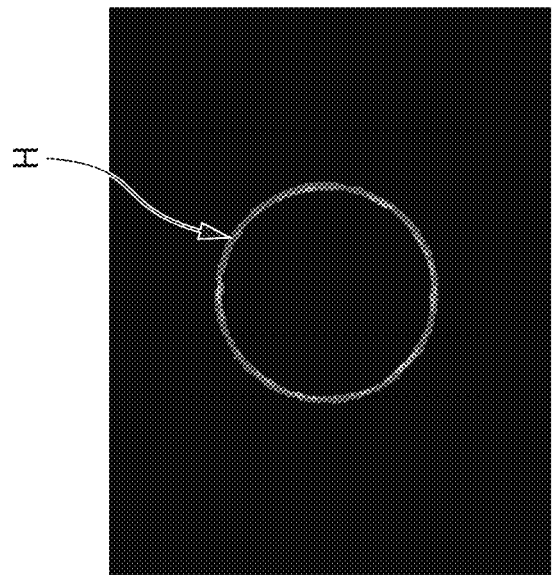

The simulation was performed under this setting condition, and it was confirmed that the electric field tends to concentrate around the profiles of the holes H. FIG. 7B is a diagram of an electric field strength distribution in the vicinity of the hole H. In FIG. 7B, the electric field strength is shown in gray scale, and the lighter color is shown for higher electric field strength. FIG. 7B shows that the electric field is concentrated around the hole H. It was also confirmed that the electric field tends to be concentrated around the profile of a relatively large hole, such as that shown on the left side of FIG. 7B, rather than around the profile of a relatively small hole, such as that shown on the right side of FIG. 7B.

The electric field strength generated in the model was calculated in this setting condition. The result shows that a portion having a high electric field strength is concentrated around the relatively large hole as described above. However, the value of the maximum electric field strength in the model is less than about 72 MV/m, for example. This value of the maximum electric field strength is an acceptable value in ensuring the reliability of the multilayer ceramic capacitor.

Figure 8:
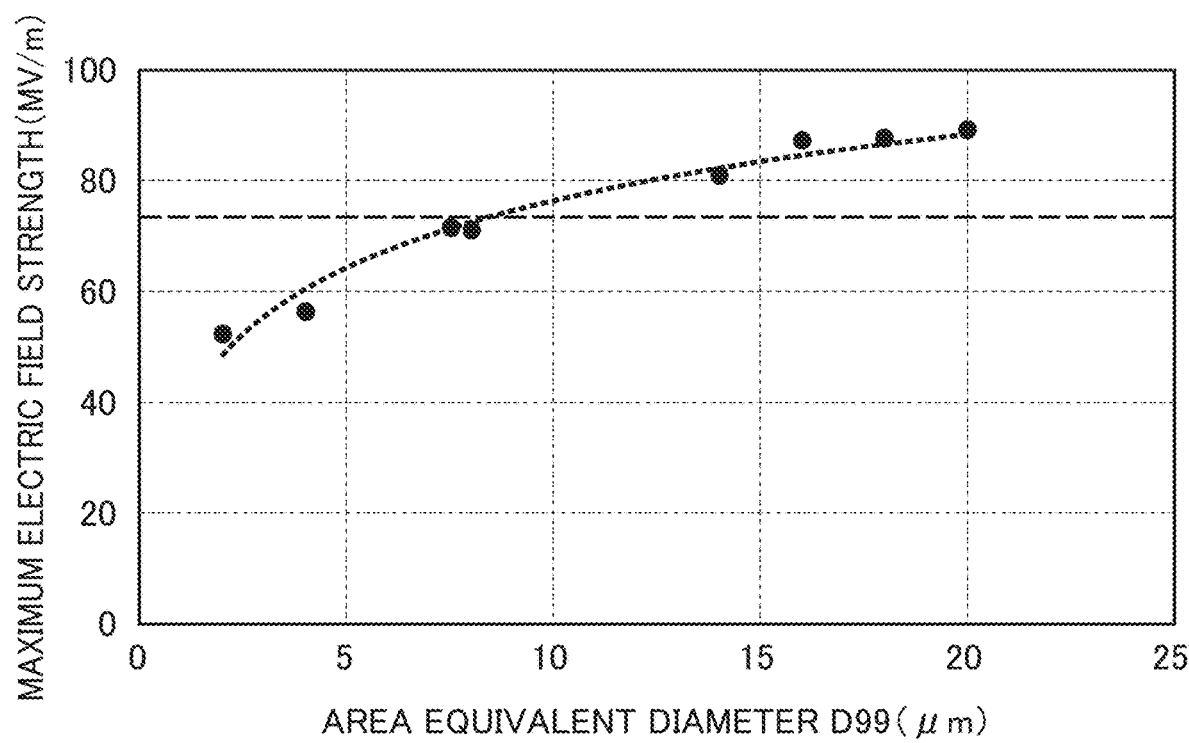
FIG. 8 is a graph of a maximum field strength in a model calculated for each simulation model in which the value of an area equivalent diameter D99 varies.

Next, using models in which the values of the area equivalent diameter D99 vary, the electric field strength generated in each model was calculated. The thickness of the internal electrode layer 30, the coverage of the internal electrode layer 30 with respect to the dielectric layer 20, the thickness of the dielectric layer 20, and the applied voltage were set to constant values, and the simulation was performed. FIG. 8 is a graph showing the results. The horizontal axis of FIG. 8 represents the value of the area equivalent diameter D99 in the model. The vertical axis of FIG. 8 represents the maximum electric field strength in the model. FIG. 8 shows an approximate curve obtained by fitting the plotted points.

First, it was confirmed that, as in the conventional internal electrode layer 30, when holes of relatively large size are present, more specifically, when the area equivalent diameter D99 of the plurality of holes H existing in the internal electrode layer 30 is greater than about 8.0 μm, for example, the value of the maximum electric field strength in the model is increased. For example, when the area equivalent diameter D99 is about 14.0 μm or more, the value of the maximum electric field strength in the model exceeds about 80 MV/m. More specifically for example, when the area equivalent diameters D99 are about 14.0 μm, about 16.0 μm, about 18.0 μm, and about 20.0 μm, the maximum electric field strengths in the models are, respectively, about 80.7 MV/m, about 86.9 MV/m, about 87.5 MV/m, and about 89.0 MV/m, and all of the maximum electric field strengths exceed about 80 MV/m.

On the other hand, it was confirmed that, when the area equivalent diameter D99 is about 8.0 μm or less, the value of the maximum electric field strength generated in the model is lower than 72 MV/m, such that the electric field concentration is reduced. For example, it was confirmed that, when the area equivalent diameter D99 is about 4.0 μm or about 2.0 μm, the maximum electric field strength becomes about 60 MV/m or less, and the concentration of the electric field is further reduced. More specifically, for example, when the area equivalent diameters D99 are about 8.0 μm, about 7.5 μm, about 4.0 μm, and about 2.0 μm, the maximum electric field strength are, respectively, 70.7 MV/m, 71.3 MV/m, 56.0 MV/m, and 52.0 MV/m, and thus are equal to or less than about 72 MV/m.

From the data of FIG. 8, it can be confirmed that the electric field concentration is reduced when the area equivalent diameter D99 is about 2.0 μm or more and about 8.0 μm or less. In addition, when the area equivalent diameter D99 is about 2.0 μm or more and about 4.0 μm or less, it can be confirmed that the electric field concentration is further reduced. Furthermore, as a result of analyzing the tendency of the data in FIG. 8, even when the area equivalent diameter D99 is about 2.0 μm or less, it is considered that the electric field concentration is reduced. For example, even when the area equivalent diameter D99 is about 1.5 μm, it is considered that the electric field concentration is reduced. For example, even when the area equivalent diameter D99 is about 1.5 μm or more and about 8.0 μm or less, the electric field concentration is considered to be reduced, and when the area equivalent diameter D99 is about 1.5 μm or more and about 4.0 μm or less, the electric field concentration is considered to be further reduced.

In this simulation, for example, the area equivalent diameter D90 of the model in which the area equivalent diameter D99 is about 8.0 μm is about 4.0 μm, the area equivalent diameter D90 of the model in which the area equivalent diameter D99 is about 7.5 μm is about 3.8 μm, the area equivalent diameter D90 of the model in which the area equivalent diameter D99 is about 4.0 μm is about 2.6 μm, and the area equivalent diameter D90 of the model in which the area equivalent diameter D99 is about 2.0 μm is about 1.9 μm. The area equivalent diameter D90 is preferably 4.0 μm or less. The area equivalent diameter D90 is more preferably about 2.6 μm or less. The area equivalent diameter D90 is preferably about 1.9 μm or more and about 4.0 μm or less. The area equivalent diameter D90 is more preferably about 1.9 μm or more and about 2.6 μm or less, for example.

Here, in order to confirm the presence or absence of the average hole diameter dependence of the maximum electric field strength, a supplementary simulation using a model in which the average diameter varies was performed while fixing the area equivalent diameter D99 of the plurality of holes H existing in the internal electrode layer 30. More specifically, a model was prepared in which the area equivalent diameter D99 of the holes H was 7.5 μm and the average diameter of the holes H was about 3.0 μm, and a model was prepared in which the area equivalent diameter D99 of the holes H was about 7.5 μm and the average diameter of the holes H was about 2.0 μm. At this time, in both models, the coverage of the internal electrode layer 30 with respect to the dielectric layer 20 was adjusted to be about 88%. In each of the models, the thickness of the internal electrode layer 30 was set to about 0.6 μm, the thickness of the dielectric layer 20 was set to about 2.0 μm, and the applied voltage was set to about 37.5 V. As a result, the values of the maximum electric field strength in both models were about 70 MV/m, and no difference was found. Thus, it was confirmed that the dependence of the average hole diameter with respect to the maximum electric field strength is low.

From the above, it was confirmed that, for example, as the value of the area equivalent diameter D99 or the value of the area equivalent diameter D90 is smaller, the electric field concentration tends to be reduced or prevented. However, the average hole diameter dependence with respect to the maximum electric field is low. Therefore, it is expected that the changes in the states of holes having large area equivalent diameters highly contribute to the reduction in the maximum electric field strength.

Second Simulation

Next, a second simulation according to the present preferred embodiment will be described. In the fourth simulation, it was confirmed whether it is possible to reduce the electric field concentration by adjusting the shapes of the holes existing in the internal electrode layer 30.

Figure 9A:
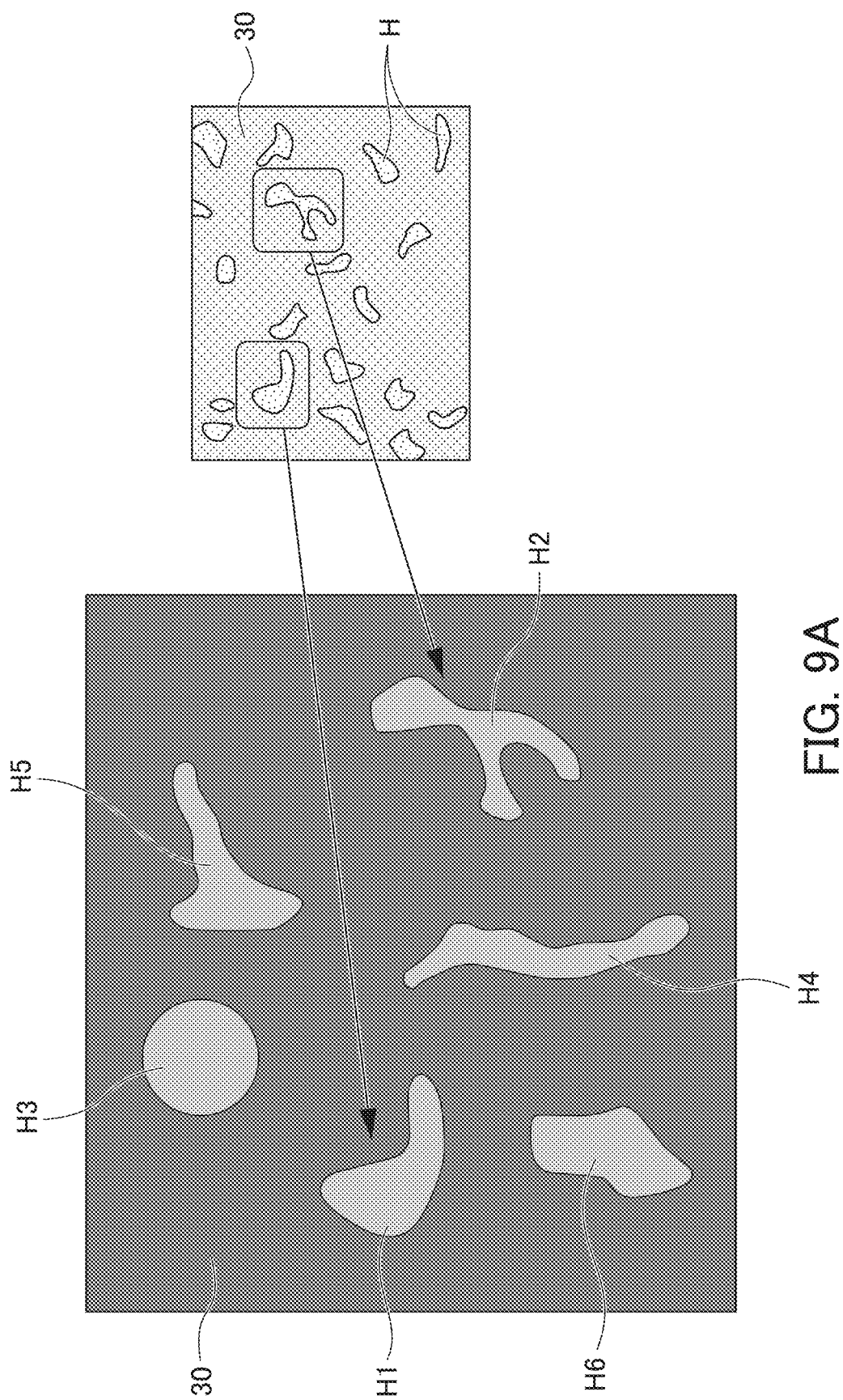
FIG. 9A is a diagram of a model of the holes in the internal electrode layer used in a second simulation.

The view on the left side of FIG. 9A is a model of the holes of the internal electrode layer 30 used in the second simulation. In this model, the shapes of the plurality of holes differ from each other. The model of the holes shown in this figure is modeled based on the profiles of the holes provided in a practically manufactured internal electrode layer 30, as shown in the figure on the right side of FIG. 9A. In the second simulation, the maximum field strength generated in the vicinity of each of the six holes H1 to H6 in the model was confirmed by setting the thickness of the internal electrode layer to about 0.6 μm, the thickness of the dielectric layer to about 2.0 μm, and the applied voltage to about 37.5 V, for example. The area equivalent diameters of all the six holes H1 to H6 were set to about 3.0 μm, for example.

First, as the shape index of the holes, the circularity of the holes is calculated. The circularity of the hole H1 was about 0.456, the circularity of the hole H2 was about 0.204, the circularity of the hole H3 was about 0.995, the circularity of the hole H4 was about 0.272, the circularity of the hole H5 was about 0.321, and the circularity of the hole H6 was about 0.704.

Figure 9B:
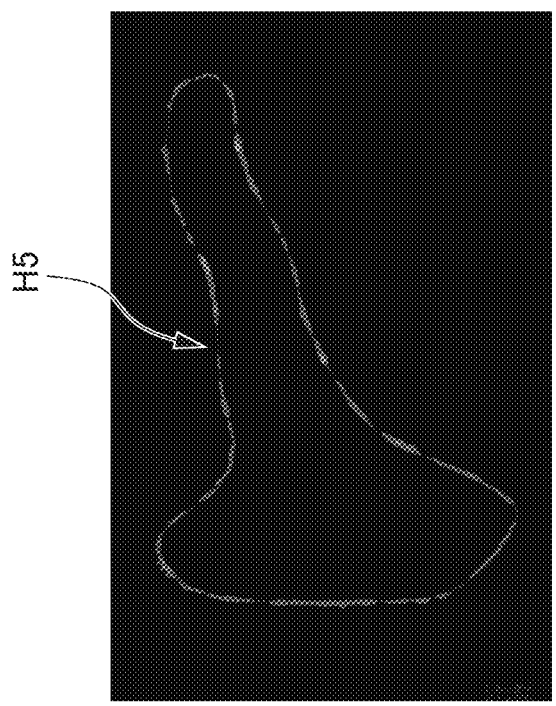
FIG. 9B is a diagram of the electric field strength distribution in the vicinity of the holes in the internal electrode layer.
Figure 9B:
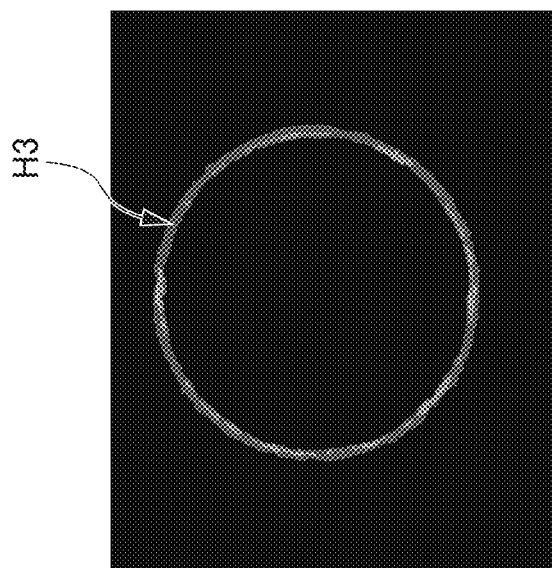

Next, simulations were performed to confirm the maximum field strength generated in the vicinity of each of the holes H1 to H6. FIG. 9B is a diagram showing, as an example, the electric field strength distribution in the vicinity of the hole H3 having a high degree of circularity, and the electric field intensity distribution in the vicinity of the hole H5 having a lower degree of circularity than the hole H3. In FIG. 9B, the electric field strength is shown in gray scale, and the lighter color is shown for higher electric field strength. As shown in FIG. 9B, it was confirmed that the maximum electric field strength generated around the profile of the hole H5 having a low circularity tends to be a lower value than the maximum electric field strength generated around the profile of the hole H3 having a high circularity.

Figure 10:
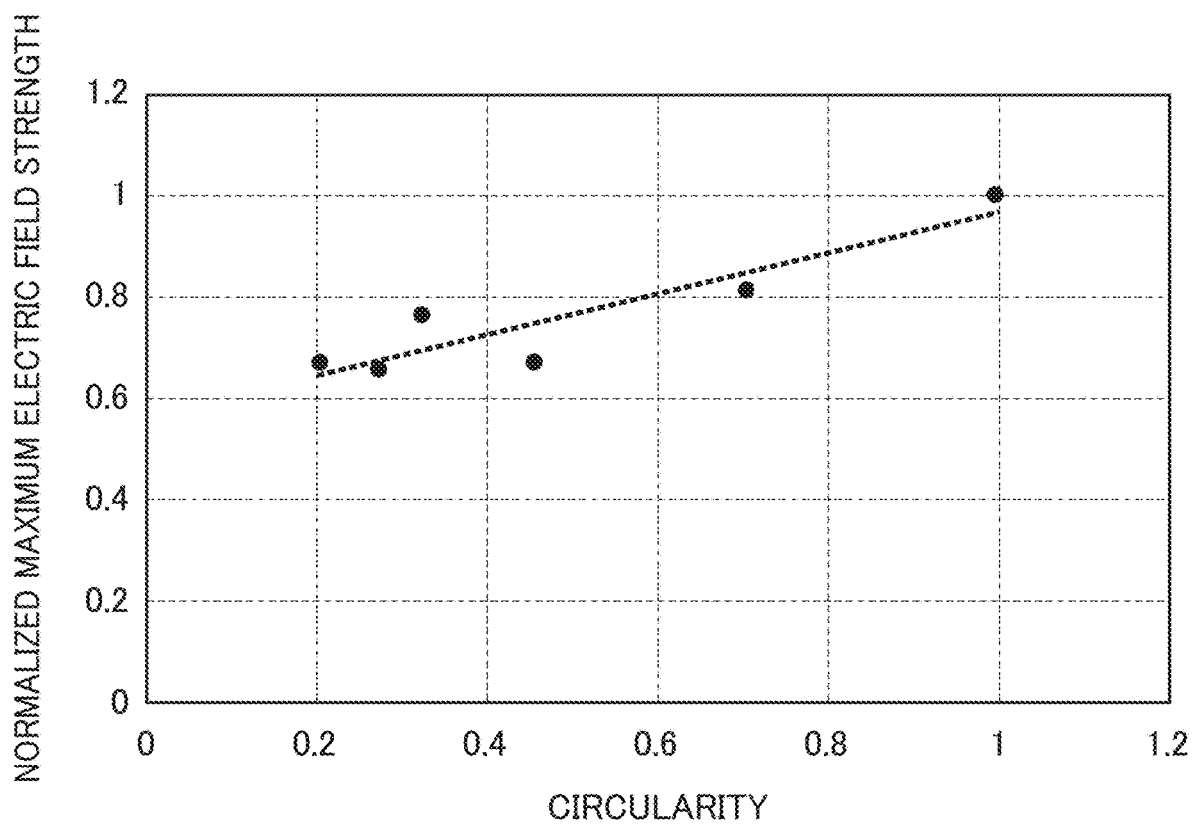
FIG. 10 is a graph of normalized plots of the maximum field strength values produced in the vicinity of holes of different circularity.

FIG. 10 is a graph of normalized plots of the values of the maximum field strengths generated in the vicinity of the respective holes H1 to H6 with different circularity. The horizontal axis of FIG. 10 represents the circularity of the hole. The vertical axis of FIG. 10 represents a numerical value obtained by normalizing the maximum electric field strength, i.e., the index number when the maximum electric field strength generated in the vicinity of the hole H3 having a perfect or nearly perfect circle is define as 1. FIG. 10 shows a straight line obtained by fitting the plotted points.

Figure 12:
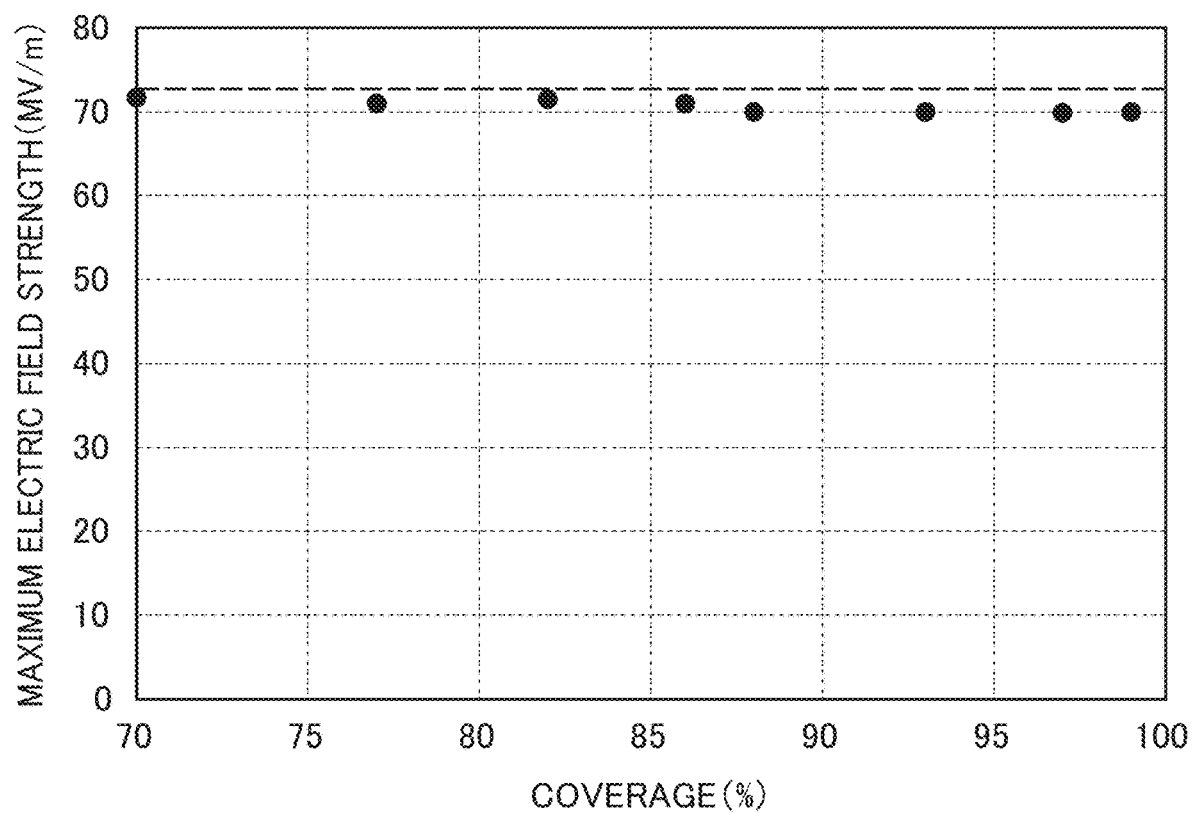
FIG. 12 is a graph plotting the maximum field strength in the model calculated for each simulation model in which the coverage of the internal electrode layer varies.

As shown in FIG. 12, the value of the maximum electric field strength was confirmed to depend on the circularity of the hole. More specifically, it was confirmed that, as the circularity of the hole is lower, the value of the maximum electric field strength is lower. For example, when the circularity of the hole is about 0.7 or less, as compared with the case where the hole is a perfect or substantially perfect circle, the maximum electric field strength is reduced about 15%. Furthermore, when the circularity is about 0.46 or less, the maximum electric field strength decreases about 30% as compared with the case where the hole is a perfect or substantially perfect circle.

Thus, by lowering the circularity of the holes existing in the internal electrode layer 30, a tendency that the electric field concentration is more reduced was obtained.

Here, from the simulation results so far, the circularity of the hole having a relatively large area equivalent diameter is expected to contribute to the reduction of the maximum electric field strength. Then, it was confirmed whether it was possible to reduce the maximum electric field strength using the model in which the distribution of the circularity varies. More specifically, a first model was prepared in which, when the area equivalent diameter in which the cumulative value in the cumulative distribution of the area equivalent diameters of the plurality of holes H existing in the internal electrode layer 30 is about 90% is defined as the area equivalent diameter D90, the average value of the circularity of the holes having the area equivalent diameter of the area equivalent diameter D90 or more is about 0.99, and the average value of the circularity of the holes having the area equivalent diameter smaller than the area equivalent diameter D90 is about 0.59. Furthermore, a second model was prepared in which, when the area equivalent diameter in which the cumulative value in the cumulative distribution of the area equivalent diameters of the plurality of holes H existing in the internal electrode layer 30 is about 90% is defined as the area equivalent diameter D90, the average value of the circularity of the holes having the area equivalent diameter D90 or more is about 0.59, and the average value of the circularity of the holes having the area equivalent diameter smaller than the area equivalent diameter D90 was about 0.99.

Figure 11:
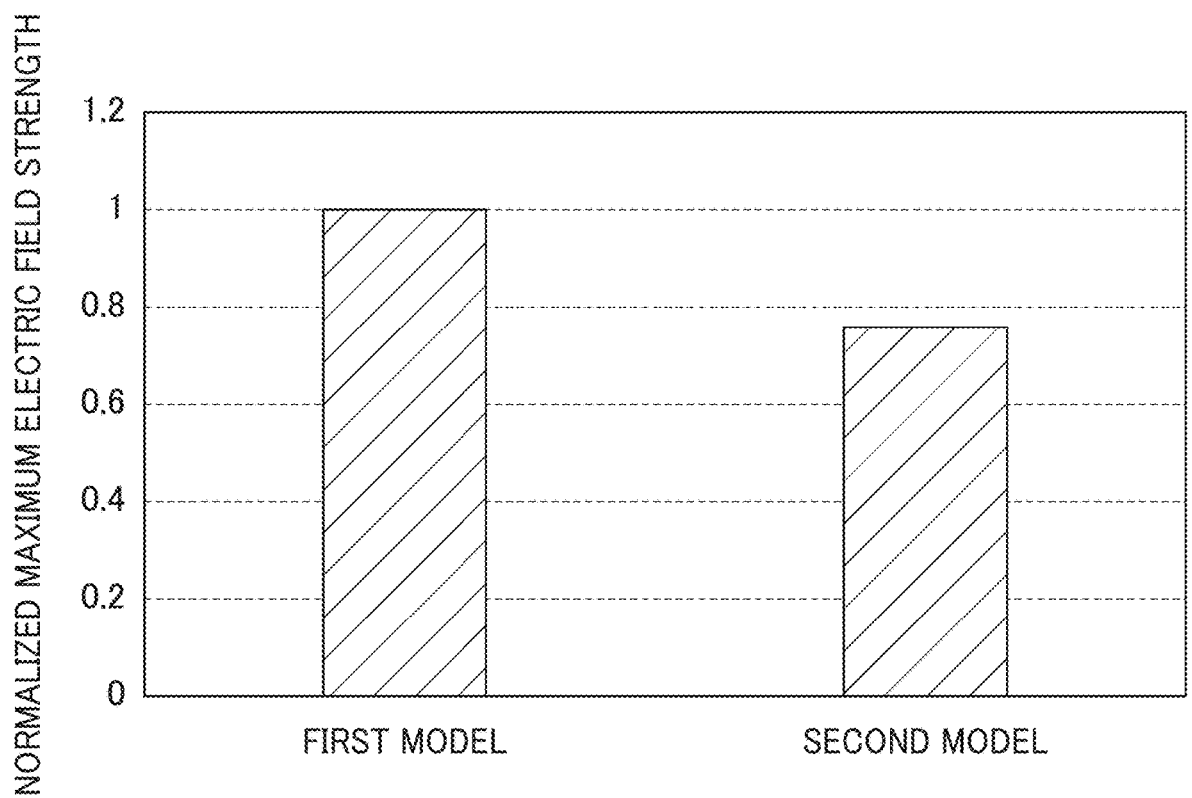
FIG. 11 is a graph of the values of the normalized maximum field strengths of the first and second models.

In the first model and the second model, for example, the maximum electric field strength generated in the model was confirmed by setting the area equivalent diameter D99 to about 7.5 μm, the thickness of the internal electrode layer to about 0.6 μm, the coverage of the internal electrode layer to the dielectric layer to about 88%, the thickness of the dielectric layer to about 2.0 μm, and the applied voltage to about 37.5 V. FIG. 11 is a graph showing the results. The vertical axis of FIG. 11 represents a numerical value obtained by normalizing the maximum electric field strength, i.e., the index number when the maximum electric field strength in the first model is defined as 1.

As shown in FIG. 11, the value of the maximum electric field strength in the second model was confirmed to be lower than the value of the maximum field intensity in the first model. More specifically, for example, it was confirmed that the value of the maximum electric field strength in the second model is lowered about 25% as compared with the value of the maximum electric field strength in the first model. That is, it was confirmed that the circularity of the holes in which the area equivalent diameter is relatively large particularly contributes to the reduction of the maximum electric field strength.

From the above, it is appreciated that it is possible to further reduce the maximum electric field strength by lowering the circularity of the hole having the area equivalent diameter D90 or more and setting the average value thereof to about 0.7 or less. In other words, it is possible to further reduce the maximum electric field strength by setting the average value of the circularity of the plurality of holes in the first population including the holes having the area equivalent diameter equal to or larger than the area equivalent diameter D90 to about 0.7 or less. Thus, it is possible to further enhance the reliability of the multilayer ceramic capacitor. More preferably, for example, the average value of the circularity of the holes having the area equivalent diameter D90 or more is about 0.46 or less. Thus, it is possible to further reduce the maximum electric field strength. Therefore, it is possible to further increase the reliability of the multilayer ceramic capacitor. The average value of the circularity of the holes having the area equivalent diameter D90 or more may be, for example, about 0.2 or more and about 0.7 or less, or may be about 0.2 or more and about 0.46 or less.

Third Simulation

Next, a third simulation as an additional simulation will be described. In the third simulation, using models in which the coverage varies, the electric field strength generated in each model was calculated. Here, the coverage refers to the coverage of the internal electrode layer 30 with respect to the dielectric layer 20.

In the third simulation, the maximum electric field strength generated in the model was confirmed by setting the area equivalent diameter D99 to about 7.5 μm, the thickness of the internal electrode layer 30 to about 0.6 μm, the thickness of the dielectric layer 20 to about 2.0 μm, and the applied voltage to about 37.5 V. FIG. 12 is a graph showing the results. The horizontal axis of FIG. 12 represents the coverage of the internal electrode layer 30 in the model, and the vertical axis of FIG. 12 represents the maximum field strength in the model.

As shown in FIG. 12, the dependence of the value of the maximum electric field strength with respect to the value of the coverage has not been confirmed. More specifically, it was confirmed that the value of the maximum electric field strength is less than about 72 MV/m when the coverage is about 70% or more and about 99% or less. For example, it was confirmed that the maximal field strength is less than 72 MV/m when the coverage is about 70%, about 77%, about 82%, about 86%, about 88%, about 93%, about 97%, and about 99%.

In order to ensure the capacitance, it is preferable that the coverage is higher. According to the third simulation, it can be confirmed that, even when the coverage is a relatively high value, for example, when the coverage is about 70% or more and about 99% or less, the reliability of the products can be improved while reducing or preventing the reduction of the capacitance by using the configuration of the present preferred embodiment. In addition, it was confirmed that, even when the coverage is in the range of about 86% or more and about 93% or less, in which the coverage is high and the productivity is also in the favorable range, the reliability of the products can be improved while reducing or preventing the reduction of the capacitance by using the configuration of the present preferred embodiment.

In addition, the data of the third simulation shown in FIG. 12 is based on the model in which the holes are perfect or substantially perfect circles. However, the same or similar tendency is obtained from the model in which the holes are not perfect or substantially perfect circles. Varying the coverage does little to change the maximum electric field strength.

Fourth Simulation

Next, a fourth simulation as an additional simulation will be described. In the fourth simulation, the electric field strength generated in each model was calculated using models in which the thickness of the internal electrode layer 30 varies.

Figure 13:
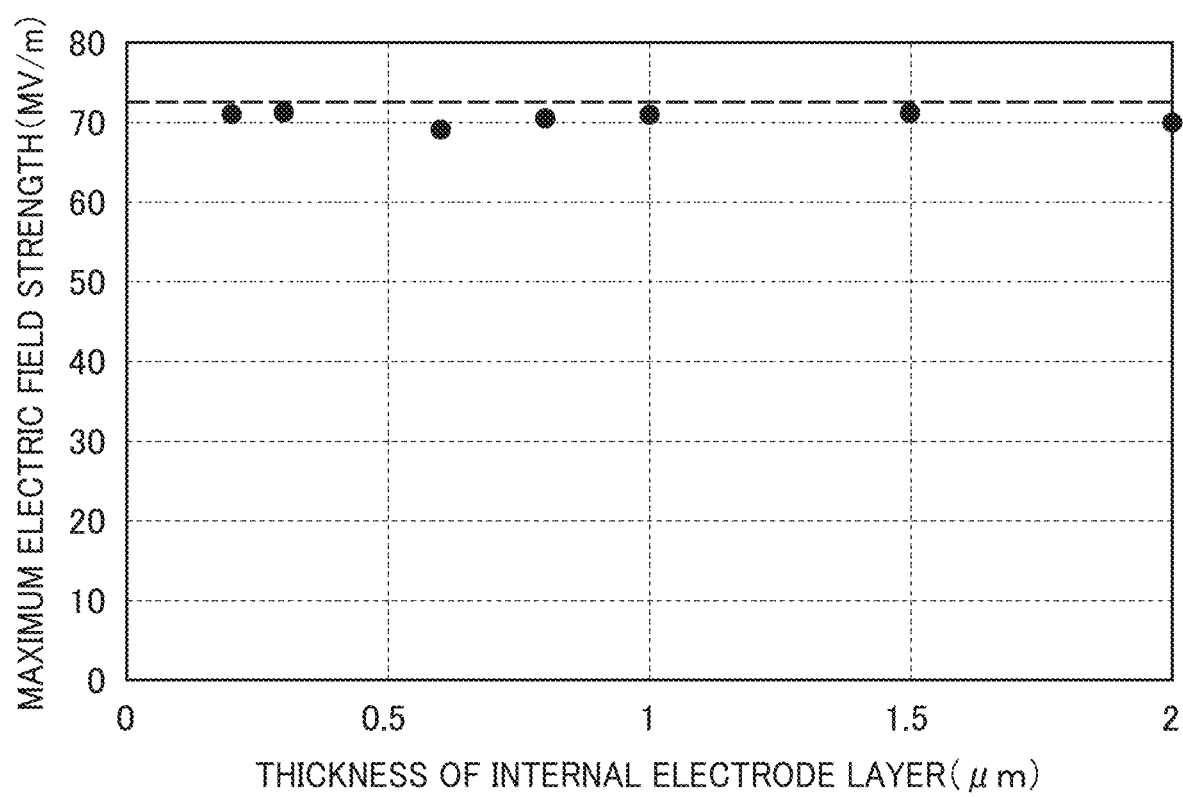
FIG. 13 is a graph plotting the maximum field strength in the model calculated for each simulation model in which the thickness of the internal electrode layer varies.

In the fourth simulation, the maximum electric field strength generated in the model was confirmed by setting the area equivalent diameter D99 to about 7.5 μm, the coverage of the internal electrode layer 30 with respect to the dielectric layer 20 to about 88%, the thickness of the dielectric layer 20 to about 2.0 μm, and the applied voltage to about 37.5 V. FIG. 13 is a graph showing the results. The horizontal axis of FIG. 13 represents the thickness of the internal electrode layer 30 in the model. The vertical axis of FIG. 13 represents the maximum field strength in the model.

As shown in FIG. 13, the dependence of the value of the maximum electric field strength with respect to the thickness of the internal electrode layer 30 has not been confirmed. More specifically, it was confirmed that, when the thickness of the internal electrode layer 30 is about 0.2 μm or more and about 2.0 μm or less, the value of the maximum electric field strength is about 72 MV/m or less. For example, it was confirmed that, when the thickness of the internal electrode layer 30 is about 0.2 μm, about 0.3 μm, about 0.6 μm, about 0.8 μm, about 1.0 μm, about 1.5 μm, and about 2.0 μm, the value of the maximum electric field strength is less than about 72 MV/m or less.

By reducing the thickness of the internal electrode layer 30, it is possible to increase the laminated number even in the multilayer body having the same or substantially same size, such that it is possible to ensure the capacitance. With the fourth simulation, even when the thickness of the internal electrode layer 30 is thin, for example, even when the thickness of the internal electrode layer 30 is about 0.2 μm or more and about 2.0 μm or less, it still can be confirmed that, by using the configuration of the present preferred embodiment, it is possible to increase the reliability of the products while reducing or preventing a decrease in the capacitance. From the data of FIG. 13, it can be confirmed that the thickness of the internal electrode layer 30 may be about 0.2 μm or more and about 1.0 μm or less, about 0.2 μm or more and about 0.8 μm or less, about 0.2 μm or more and about 0.6 μm or less, or about 0.2 μm or more and about 0.3 μm or less, for example.

The thickness of the internal electrode layer 30 may be smaller than the value of the area equivalent diameter D99 described above. For example, while the area equivalent diameter D99 is about 2.0 μm or more and about 8.0 μm or less, the thickness of the internal electrode layer 30 may be less than about 2.0 μm. For example, while the area equivalent diameter D99 is about 1.5 μm or more and about 8.0 μm or less, the thickness of the internal electrode layer 30 may be about 0.8 μm or less. In this case, the area equivalent diameter D99 becomes a larger value than the dimension of the thickness of the internal electrode layer 30. When the area equivalent diameter D99 is a predetermined value or less, and the dimension of the thickness of the internal electrode layer 30 is made smaller than the value of the area equivalent diameter D99, it is possible to reduce the electric field concentration while using a configuration that easily ensures the capacitance.

The thickness of the internal electrode layer 30 may be half or less the value of the area equivalent diameter D99 described above. For example, while the area equivalent diameter D99 is about 2.0 μm or more and about 8.0 μm or less, the thickness of the internal electrode layer 30 may be about 0.8 μm or less. For example, while the area equivalent diameter D99 is about 1.5 μm or more and about 8.0 μm or less, the thickness of the internal electrode layer 30 may be about 0.6 μm or less. When the area equivalent diameter D99 is a predetermined value or less, and the dimension of the thickness of the internal electrode layer 30 is made to a size less than half the value of the area equivalent diameter D99, it is possible to reduce the electric field concentration while using a configuration that easily ensures the capacitance.

The thickness of the internal electrode layer 30 may be smaller than the value of the area equivalent diameter D90 described above. In this case, the area equivalent diameter D90 is a larger value than the dimension of the thickness of the internal electrode layer 30. For example, the area equivalent diameter D90 may be about 4.0 μm or less, about 3.8 μm or less, or about 2.6 μm or less, and the thickness of the internal electrode layer 30 may be smaller than the value of the area equivalent diameter D90. When the area equivalent diameter D90 is a predetermined value or less, and the dimension of the thickness of the internal electrode layer 30 is made smaller than the value of the area equivalent diameter D90, it is possible to reduce the electric field concentration while using a configuration that easily ensures the capacitance.

The thickness of the internal electrode layer 30 may be half or less the value of the area equivalent diameter D90 described above. For example, the area equivalent diameter D90 may be about 4.0 μm or less, about 3.8 μm or less, or about 2.6 μm or less, and the thickness of the internal electrode layer 30 may be half or less the area equivalent diameter D90. When the area equivalent diameter D90 is a predetermined value or less, and the dimension of the thickness of the internal electrode layer 30 is made to a size less than half the value of the area equivalent diameter D90, it is possible to reduce the electric field concentration while using a configuration that easily ensure the capacitance.

In addition, the data of the third simulation shown in FIG. 13 is based on the model in which the holes are perfect or substantially perfect circles. However, the same or similar tendency is obtained from the model in which the holes are not perfect or substantially perfect circles. Varying the coverage does little to change the maximum electric field strength.

Hereinafter, a non-limiting example of a method of measuring various parameters will be described. Various parameters can be confirmed by the following method.

First, a measurement target region for measuring parameters such as the area equivalent diameter D99, the area equivalent diameter D90, and the average value of the circularity will be described.

Here, the inventor of preferred embodiments of the present invention repeatedly conducted investigation, experiments, and simulations, and has obtained knowledge, in particular, that it is preferable to make the holes in a predetermined region of the internal electrode layer into an appropriate state in order to improve the reliability of multilayer ceramic electronic components such as the multilayer ceramic capacitors. More specifically, the inventor of preferred embodiments of the present invention repeatedly performed the analysis or the like after the accelerated life test of the multilayer ceramic capacitors, and have obtained knowledge that the burned position at the time of electrical breakdown of the multilayer body of the multilayer ceramic capacitor is often located in a region which is in the vicinity of the side surface-side outer layer portion and slightly spaced away from the side (end portion) of the internal electrode layer, such that it is preferable to make the hole in this region an appropriate state.

Figure 14:
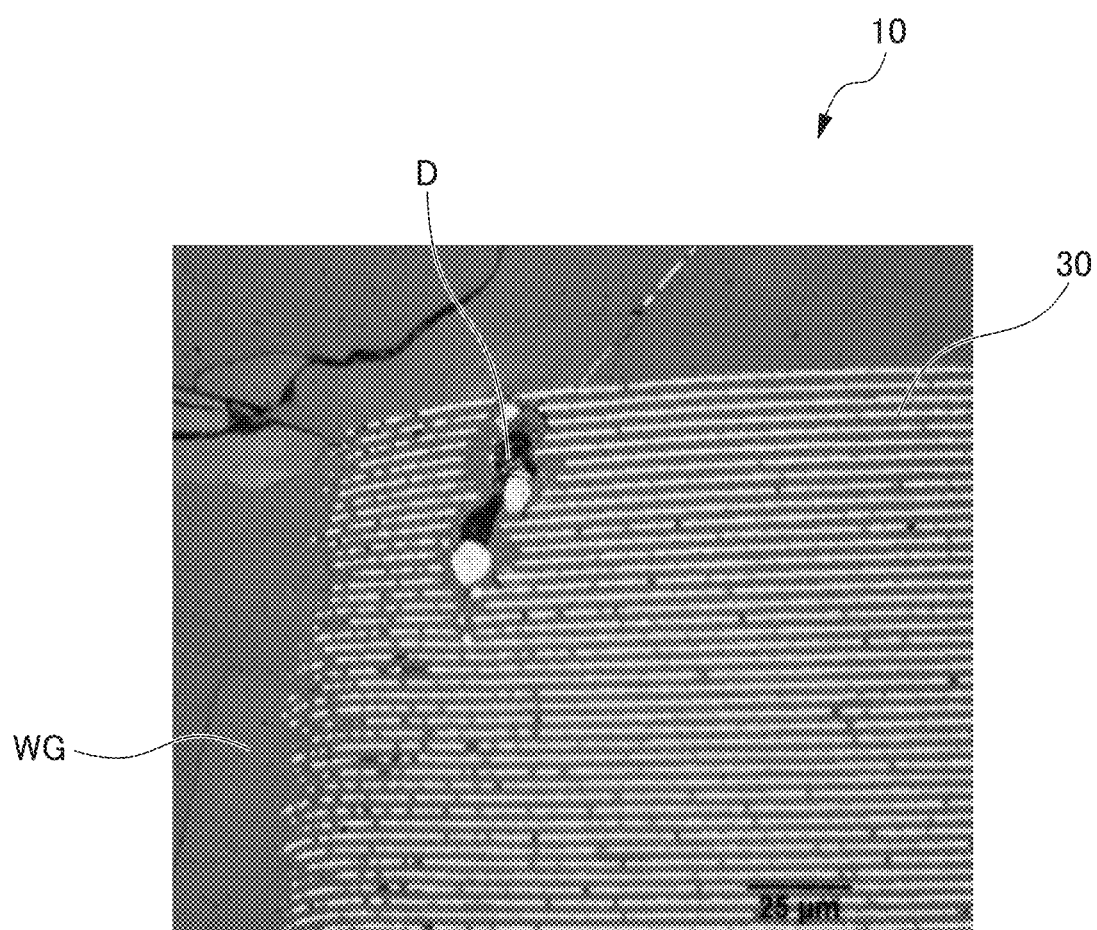
FIG. 14 is an image of a scanning electron microscope corresponding to the enlarged view of the XIV portion of the multilayer ceramic capacitor shown in FIG. 3, and is a diagram showing a burned state at the time of electrical breakdown of a multilayer body when subjected to an accelerated life test.

FIG. 14 is an image of a scanning electron microscope (SEM) corresponding to the enlarged view in the WT cross section of the XIV portion of the multilayer ceramic capacitor shown in FIG. 3, and is a diagram showing a burned state at the time of electrical breakdown of the multilayer body 10 when subjected to an accelerated life test. Thus, in the multilayer ceramic capacitor 1, a burned point D of the multilayer body 10 is likely to occur in a region which is in the vicinity of the side surface-side outer layer portion WG and slightly spaced away from the side of the internal electrode layer 30.

Therefore, it is preferable to set the plurality of holes H of the internal electrode layer 30 in this region to an appropriate state. Furthermore, it is preferable that the above-described measurement target region is set in a region which is in the vicinity of the side surface-side outer layer portion WG and is slightly spaced away from the side of the internal electrode layer 30.

More specifically, it is preferable to set a first region A1, a second region A2, a third region A3, and a fourth region A4 in the first internal electrode layer 31 as the measurement target regions. The first region A1 is defined as a region from a position about 10 μm away from the first side WE1 to a position about 50 μm away from the first side WE1. The second region A2 is defined as a region from a position about 10 μm away from the second side WE2 to a position about 50 μm away from the second side WE2. The third region A3 is defined as a region from a position about 10 μm away from the third side to a position about 50 μm away from the third side. The fourth region A4 is defined as a region from a position about 10 μm away from the fourth side to a position about 50 μm away from the fourth side. When the linearity of the first side WE1 to the fourth side WE4 is low, each side is defined as a straight line by linear fitting according to linear regression, such that the first region A1 to the fourth region A4 are defined, for example.

FIG. 4A schematically shows the first region A1 and the second region A2 as measuring target regions. FIG. 4B schematically shows the third region A3 and the fourth region A4 as the measuring target regions.

In the first region A1, the second region A2, the third region A3, and the fourth region A4 as the measurement target regions, a measurement target range for practically performing the measurement of the parameter based on the SEM observation is set.

In the SEM observation, the observation range in one observation field is set to about 40 μm×about 40 μm to about 80 μm×about 80 μm, for example. The analysis target range is set to a range of about 40 μm×about 40 μm, for example. Then, parameters such as an area equivalent diameter and the like are measured based on the set of 12 analysis target ranges. More specifically, in each region of the first region A1, the second region A2, the third region A3 and the fourth region A4, the analysis target range a is set at three locations each. The analysis target ranges a of the three locations are set within the range of the opposing electrode portion 11E.

Among the three analysis target ranges a, the analysis target range a that is set closest to the first end surface LS1 is set to a position about 10 μm away from the first end surface-side outer layer portion LG1. Among the three analysis target ranges a, the analysis target range a that is set closest to the second end surface LS2 is set to a position about 10 μm away from the second end surface-side outer layer portion LG2. Among the three analysis target ranges a, the analysis target range a that is set at the middle position is set at the middle position in the length direction L of the multilayer body 10. The three analysis target ranges a are set at positions, each having an equal interval in the length direction L of the multilayer ceramic capacitor, for example. FIG. 4A shows, as an example, the analysis target ranges a at three locations set in the second region A2. Furthermore, a measurement target range in which a parameter such as the area equivalent diameter D99 is measured is set by a set of 12 analysis target ranges a in total of 4 regions×3 locations.

When the chip size of the multilayer ceramic electronic component is small, the first region A1 to the fourth region A4 may be set to positions overlapping each other. Each analysis target range a may also be set to positions overlapping each other. In this case, the respective regions are set at different positions while being overlapped with each other, and the respective analysis target ranges are set so as to cover as large a region of the internal electrode layer as possible.

Method of Measuring Area Equivalent Diameters D99 and D90

A non-limiting example of a method of measuring the area equivalent diameters D99 and D90 of the holes existing in the internal electrode layer 30 will be described.

First, the internal electrode layer 30 is exposed by peeling the internal electrode layer 30 and the dielectric layer 20 located at the middle portion in the height direction of the multilayer body 10 by electric field peeling. Next, a portion of the first to fourth regions A1 to A4 as the measurement target regions of the internal electrode layer 30 is set as the above-described analysis target range a, and SEM observation is performed. When the first internal electrode layer 31 is exposed, first, portions of the first region A1 and the second region A2 of the first internal electrode layer 31 are set as the above-described analysis target ranges a, and SEM observation is performed. Thereafter, the second internal electrode layer 32 is exposed by the FIB (Focused Ion Beam) process. Furthermore, portions of the third region A3 and the fourth region A4 of the second internal electrode layer 32 are set as the above-described analysis target range a, and SEM observation is performed. After the SEM observation of the second internal electrode layer 32, the SEM observation of the first internal electrode layer 31 may be performed.

In the SEM observation, the SEM image is analyzed to identify the profiles of the individual holes provided in the internal electrode layer 30. Thereafter, for each hole provided in the internal electrode layer 30, the area equivalent diameter of the hole is calculated based on the area of the hole defined by the profile of the hole. The area equivalent diameter refers to the value of the diameter of a perfect or substantially perfect circle with an area equal to the area of the hole defined by the hole profile.

The area equivalent diameters of the individual holes are calculated for the twelve analysis target ranges a of the measurement target range. Here, when the area of the holes is less than about 1.0 $\mu m^2$, noise may be generated instead of the holes. Therefore, in order to exclude the influence of noise, in the subsequent analysis, noise is excluded from the analysis target.

The measurement target range, i.e., a set of all the holes identified in the analysis target ranges at 12 locations (excluding those in which the area of the holes is less than about 1.0 μm$^2$), is set as a population of holes.

The area equivalent diameter D99 and the area equivalent diameter D90 are calculated based on the data of the area equivalent diameters of the population of holes in the measurement target range. The area equivalent diameter D99 is calculated as the area equivalent diameter in which the cumulative value in the cumulative distribution of the number basis of the area equivalent diameters of the plurality of holes existing in the measurement target area is about 99%. The area equivalent diameter D90 is calculated as the area equivalent diameter in which the cumulative value in the cumulative distribution of the number basis of the area equivalent diameters of the plurality of holes existing in the measurement target area is about 90%.

Method of Measuring Circularity of Holes

A non-limiting example of a method of measuring the circularity of the holes existing in the internal electrode layer 30 will be described.

First, the internal electrode layer 30 is exposed by peeling the internal electrode layer 30 and the dielectric layer 20 located at the middle portion in the height direction of the multilayer body 10 by electric field peeling. Next, a portion of the first to fourth regions A1 to A4 as the measurement target regions of the internal electrode layer 30 is set as the above-described analysis target range a, and SEM observation is performed. When the first internal electrode layer 31 is exposed, first, portions of the first region A1 and the second region A2 of the first internal electrode layer 31 are set as the above-described analysis target ranges a, and SEM observation is performed. Thereafter, the second internal electrode layer 32 is exposed by the FIB (Focused Ion Beam) process. Furthermore, portions of the third region A3 and the fourth region A4 of the second internal electrode layer 32 are set as the above-described analysis target range a, and SEM observation is performed. After the SEM observation of the second internal electrode layer 32, the SEM observation of the first internal electrode layer 31 may be performed.

In the SEM observation, the SEM image is analyzed to identify the profiles of the individual holes provided in the internal electrode layer 30. Thereafter, for each hole provided in the internal electrode layer 30, the area equivalent diameter of the hole is calculated based on the area of the hole defined by the profile of the hole. The area equivalent diameter refers to the value of the diameter of a perfect or substantially perfect circle with an area equal to the area of the hole defined by the hole profile.

The area equivalent diameters of the individual holes are calculated for the twelve analysis target ranges a of the measurement target range. Here, when the area of the holes is less than about 1.0 μm$^2$, noises may be generated instead of the holes. Therefore, in order to exclude the influence of the noise, in the subsequent analysis, the noise is excluded from the analysis target.

The measurement target range, i.e., a set of all the holes identified in the analysis target ranges at 12 locations (excluding those in which the area of the holes is less than about 1.0 μm$^2$) is set as a population of holes.

For each hole in the population of holes, the circularity of the holes is calculated by the following expression (1) based on the area of the hole and the length of the circumference defined by the profile of the hole.

$$\text{Circularity} = 4\pi \times (\text{Area})/(\text{Circumference length})^2 \quad (1)$$

Furthermore, the population of the holes existing in the measurement target region is divided into a first population including holes having an area equivalent diameter equal to or larger than the area equivalent diameter D90, and a second population including holes having an area equivalent diameter smaller than the area equivalent diameter D90. Furthermore, the average value of the circularity of the plurality of holes in the first population including the holes having the area equivalent diameter equal to or larger than the area equivalent diameter D90 is calculated. This is defined as the average value of the circularity of the plurality of holes in the first population of the present preferred embodiment of the present invention.

Method of Measuring Coverage

A non-limiting example of a method for measuring the coverage as the coverage of the internal electrode layer 30 with respect to the dielectric layer 20 will be described.

First, the internal electrode layer 30 is exposed by peeling the internal electrode layer 30 and the dielectric layer 20 located at the middle portion in the height direction of the multilayer body 10 by electric field peeling. Next, a portion of the first to fourth regions A1 to A4 as the measurement target regions of the internal electrode layer 30 is set as the above-described analysis target range a, and SEM observation is performed. When the first internal electrode layer 31 is exposed, first, portions of the first region A1 and the second region A2 of the first internal electrode layer 31 are set as the above-described analysis target ranges a, and SEM observation is performed. Thereafter, the second internal electrode layer 32 is exposed by the FIB (Focused Ion Beam) process. Furthermore, portions of the third region A3 and the fourth region A4 of the second internal electrode layer 32 are set as the above-described analysis target range a, and SEM observation is performed. After the SEM observation of the second internal electrode layer 32, the SEM observation of the first internal electrode layer 31 may be performed.

Thereafter, by analyzing the SEM image, the region of the internal electrode layer 30 in the analysis target range a is identified. Thereafter, based on the area of the analysis target range a and the area of the region of the internal electrode layer 30, the coverage of the internal electrode layer 30 with respect to the dielectric layer 20 is calculated by the following expression (2).

$$\text{Coverage (\%)} = (\text{Area of internal electrode layer}/\text{Area of analysis target range}) \times 100 \quad (2)$$

For the twelve analysis target ranges of the measurement target range, the coverage of the internal electrode layer 30 with respect to the dielectric layer 20 is calculated. Then, the average value is defined as the coverage of the internal electrode layer 30 with respect to the dielectric layer 20 of the present preferred embodiment of the present invention.

Method of Measuring Thickness of Internal Electrode Layer

A non-limiting example of a method of measuring the thickness of the plurality of internal electrode layers 30 will be described.

First, the multilayer ceramic capacitor is cross-sectionally polished to a position of about ½ in the L dimension, to expose a particular WT cross-section. Then, the WT cross-section of the multilayer body 10 exposed by polishing is observed with SEM.

Next, the thicknesses of the internal electrode layer 30 are measured on a total of five lines including a center line passing through the center or approximate center of the cross section of the multilayer body 10 along the stacking direction, and lines drawn at two equal or substantially equal intervals on both sides from the center line. Here, the thicknesses of the internal electrode layer 30 at the five locations are measured in each of the three portions in the stacking direction of the multilayer body 10. Then, the average value of the thicknesses of the internal electrode layer 30 of a total of 15 locations of the three portions×the 5 locations, is defined as the thickness of the internal electrode layer 30 in the present preferred embodiment of the present invention.

Next, a non-limiting example of a method of manufacturing the multilayer ceramic capacitor 1 of the present preferred embodiment of the present invention will be described.

A dielectric sheet for the dielectric layer 20 and an electrically conductive paste for the internal electrode layer 30 are provided. The electrically conductive paste for the dielectric sheet and the internal electrode includes a binder and a solvent. For example, known binders and solvents may be used.

On the dielectric sheet, an electrically conductive paste for the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are prepared.

By laminating a predetermined number of dielectric sheets in which the pattern of the internal electrode layer is not printed, a portion defining and functioning as the first main surface-side outer layer portion 12 in the vicinity of the first main surface TS1 is formed. On top of that, the dielectric sheets in which the pattern of the first internal electrode layer 31 is printed, and the dielectric sheets in which the pattern of the second internal electrode layer 32 is printed are sequentially laminated, such that a portion defining and functioning as the inner layer portion 11 is formed. On this portion defining and functioning as the inner layer portion 11, a predetermined number of dielectric sheets in which the pattern of the internal electrode layer is not printed are laminated, such that a portion defining and functioning as the second main surface-side outer layer portion 13 in the vicinity of the second main surface TS2 is formed. Thus, a laminated sheet is produced.

The laminated sheet is pressed in the height direction by hydrostatic pressing, for example, such that a laminated block is produced.

The laminated block is cut to a predetermined size, such that laminate chips are cut out. At this time, corners and ridges of the laminate chip may be rounded by, for example, barrel polishing or the like.

The laminate chip is fired to produce the multilayer body 10. The firing temperature depends on the materials of the dielectric layers 20 and the internal electrode layers 30, but is preferably about 900° C. or more and about 1400° C. or less, for example.

Here, in order to set the area equivalent diameter D99 of the holes existing in the internal electrode layer 30 to a predetermined value or less, for example, about 8.0 μm or less, about 7.5 μm or less, or about 4.0 μm or less, and in order for the area equivalent diameter D99 of the holes existing in the internal electrode layer 30 to fall within a predetermined range, the above-described manufacturing conditions are adjusted.

More specifically, the pressure, the temperature, and the pressing time at the time of lamination of the dielectric sheet on which the pattern of the internal electrode layer 30 is printed, are adjusted, such that the area equivalent diameter D99 of the holes existing in the internal electrode layer 30 is adjusted to be equal to or less than a predetermined value. For example, when the internal electrode layer 30 is relatively thin, the pressure at the time of pressing the laminate sheet is set to higher.

Furthermore, the material of the electrically conductive paste for the internal electrode layer 30 may be prepared in order to set the area equivalent diameter D99 of the holes existing in the internal electrode layer 30 to a predetermined value or less. For example, when the main component of the internal electrode layer 30 is Ni, particles of larger average particle size are used as Ni particles as a raw material of the electrically conductive paste, such that the bonding start temperature between Ni particles and the sintering shrinkage start temperature of the ceramic can be brought closer together. As a result, the internal electrode layer 30 is restrained from balling, and the area equivalent diameter D99 is adjusted to be equal to or less than a predetermined value. Furthermore, when the same ceramic powder as the ceramic powder included in the dielectric layer 20 is added as a co-material to the electrically conductive paste for the internal electrode layer 30, the bonding initiation temperature between Ni particles and the sintering shrinkage initiation temperature of the ceramic can be brought closer together by using a co-material having a larger average particle diameter. As a result, the internal electrode layer 30 is restrained from balling, and the area equivalent diameter D99 is adjusted to be equal to or less than a predetermined value. Furthermore, by controlling the Ni particles of the electrically conductive paste for the internal electrode layer 30, the co-material, and the affinity between the solvents, the co-material dispersibility may be increased. As a result, the internal electrode layer 30 is restrained from balling, and the area equivalent diameter D99 of the holes is adjusted to be equal to or less than a predetermined value.

Furthermore, the laminate chips may be provided densely side by side during firing, such that the uniformity of the temperature in the chips during firing is improved. As a result, the internal electrode layer 30 is restrained from balling, and the area equivalent diameter D99 is adjusted to be equal to or less than a predetermined value. Furthermore, by firing the laminate chips in a state embedded in the ceramic powder, the uniformity of the temperature inside and outside of the chips during firing may be improved. As a result, the internal electrode layer 30 is restrained from balling, and the area equivalent diameter D99 is adjusted to be equal to or less than a predetermined value. At the time of firing, the temperatures of portions in the vicinity of the first side surface and the second side surface of the laminate chip, for example, the side in the vicinity of the first side surface WS1 and the side of the second side surface WS2 of the internal electrode layer 30, tend to rise. Therefore, the internal electrode layer 30 tends to be balled in these portions. However, according to the above-described method, balling is reduced or prevented in the first to fourth regions A1 to A4 of the internal electrode layer 30, such that the area equivalent diameter D99 of the holes existing in the internal electrode layer 30 can be set to a predetermined value or less.

By forming the internal electrode layer 30 by two-stage printing, for example, the internal electrode layer 30 may be provided such that the area equivalent diameter D99 of the holes existing in at least the portions in the vicinity of the first side surface and the second side surface of the laminate chip, for example, in the first portion A1 to the fourth region A4 is equal to or smaller than a predetermined value. In this case, an electrically conductive paste including Ni particles having a large average particle size and a co-material having a large average particle size is printed on at least the first region A1 to the fourth region A4. Then, the electrically conductive paste including the Ni particles having a relatively small average particle size and the co-material having a relatively small average size is printed on the other regions including the central region of the internal electrode layer 30. As a result, the area equivalent diameter D99 of the holes existing in at least the first to fourth regions A1 to A4 can be set to a predetermined value or less.

The above-described method of setting the area equivalent diameter D99 of the holes existing in the internal electrode layer 30 to a predetermined value or less can be appropriately combined. Thus, the area equivalent diameter D99 of the holes existing in the internal electrode layer 30 can be set to a predetermined value or less, for example, about 8.0 μm or less, about 7.5 μm or less, or about 4.0 μm or less, or can be adjusted within a predetermined range. Similarly, by the above-described method, the area equivalent diameter D90 of the holes existing in the internal electrode layer 30 can be adjusted to be equal to or less than for example, about 8.0 μm or less, about 7.5 μm or less, or about 4.0 μm or less, or can be adjusted within a predetermined range.

Here, the material of the electrically conductive paste for the internal electrode layer 30 may be prepared in order to set the degree of circularity of the plurality of holes existing in the internal electrode layer 30 to a predetermined value or less, for example, to set the average value of the degree of circularity of the holes having the area equivalent diameter D90 or more to about 0.7 or less, or to about 0.46 or less. For example, when the main component of the internal electrode layer 30 is Ni, particles having variations in particle size may be used as Ni particles as a raw material of the electrically conductive paste. As a result, a hole having an irregular shape in which a plurality of small holes are connected is formed, such that the degree of circularity of the larger hole can be reduced. Furthermore, when the same ceramic powder as the ceramic powder included in the dielectric layer 20 is added as a co-material, a co-material having a variation in particle diameter may be used as the co-material. As a result, a hole having an irregular shape in which a plurality of small holes are connected is formed, such that the degree of circularity of the larger hole can be reduced. By using these methods, the average value of the circularity of the holes having the area equivalent diameter D90 or more can be set to a predetermined value or less.

By forming the internal electrode layer 30 by, for example, two-stage printing, the internal electrode layer 30 may be provided such that the degree of circularity of the holes existing in at least the portions in the vicinity of the first side surface and the second side surface of the laminate chip, for example, in the first portion A1 to the fourth region A4, is equal to or smaller than a predetermined value. In this case, an electrically conductive paste including Ni particles having various particle sizes and a co-material having various particle sizes is printed on at least the first region A1 to the fourth region A4. Then, the electrically conductive paste including the Ni particles having various particle sizes and the co-material having various particle sizes is printed on the other regions including the center region of the internal electrode layer 30. As a result, the average value of the circularity of the holes having the area equivalent diameter D90 or more of the holes existing at least in the first to fourth regions A1 to A4 can be set to a predetermined value or less. In addition, by using such a method, the internal electrode layer 30 may be provided such that the average value of the circularity of the holes existing in the first to fourth regions A1 to A4 is lower than the average value of the circularity of the holes existing in the center region of the internal electrode layer 30.

The electrically conductive paste defining and functioning as a base electrode layer (the first base electrode layer 50A and the second base electrode layer 50B) is applied to both end surfaces of the multilayer body 10. In the present preferred embodiment, the base electrode layer is a fired layer. An electrically conductive paste including a glass component and metal is applied to the multilayer body 10 by, for example, a method such as dipping. Thereafter, a firing process is performed to form the base electrode layer. The temperature of the firing process at this time is preferably about 700° C. or higher and about 900° C. or lower, for example.

In a case in which the laminate chip before firing and the electrically conductive paste applied to the laminate chip are fired simultaneously, it is preferable that the fired layer is formed by firing a layer to which a ceramic material is added, instead of a glass component. At this time, it is particularly preferable to use, as the ceramic material to be added, the same type of ceramic material as the dielectric layer 20. In this case, an electrically conductive paste is applied to the laminate chip before firing, and the laminate chip and the electrically conductive paste applied to the laminate chip are fired simultaneously, such that the multilayer body 10 having a fired layer formed therein is formed.

Thereafter, the plated layer is formed on the surface of the base electrode layer. In the present preferred embodiment of the present invention, the first plated layer 60A is formed on the first base electrode layer 50A. The second plated layer 60B is formed on the second base electrode layer 50B. In the present preferred embodiment of the present invention, for example, the Ni plated layer and the Sn plated layer are formed as the plated layer. Upon performing the plating process, electrolytic plating or electroless plating may be used. However, the electroless plating has a disadvantage in that a pretreatment with a catalyst or the like is necessary in order to improve the plating deposition rate, and thus the process is complicated. Therefore, normally, electrolytic plating is preferably used. The Ni plated layer and Sn the plated layer are sequentially formed, for example, by barrel plating.

In a case in which the base electrode layer is formed with a thin film layer, such a thin film layer as the base electrode layer is formed at a portion where the external electrode is to be formed by performing masking or the like. The thin film layer is formed by a thin film forming method such as, for example, a sputtering method or a deposition method. The thin film layer is, for example, a layer of about 1.0 μm or less on which metal particles are deposited.

When the electrically conductive resin layer is provided as the base electrode layer, the electrically conductive resin layer may cover the fired layer, or may be provided directly on the multilayer body 10 without providing the fired layer. When the electrically conductive resin layer is provided, an electrically conductive resin paste including a thermosetting resin and a metal component is applied onto the fired layer or the multilayer body 10, and then heat-treated at a temperature of about 250° C. to about 550° C. or higher, for example. As a result, the thermosetting resin is thermally cured to form an electrically conductive resin layer. The atmosphere at the time of this heat treatment is preferably, for example, an N2 atmosphere. Furthermore, in order to prevent scattering of the resin and to prevent oxidation of various metal components, the oxygen concentration is preferably about 100 ppm or less, for example.

The plated layer may be provided directly on the exposed portion of the internal electrode layer 30 of the multilayer body 10 without providing the base electrode layer. In this case, a plating process is performed on the first end surface LS1 and the second end surface LS2 of the multilayer body 10 such that a plated layer is provided on the exposed portion of the internal electrode layer 30. Upon performing the plating process, electrolytic plating or electroless plating may be used. However, the electroless plating has a disadvantage in that a pretreatment with a catalyst or the like is necessary in order to improve the plating deposition rate, and thus the process becomes complicated. Therefore, normally, electrolytic plating is preferably used. It is preferable to use, for example, barrel plating for the plating method. Furthermore, the upper plated layer provided on the surface of the lower plated layer may be provided as necessary by the same or substantially the same method as the lower plated layer.

By such a manufacturing process, the multilayer ceramic capacitor 1 is manufactured.

The configuration of the multilayer ceramic capacitor 1 is not limited to the configuration shown in FIGS. 1 to 4B. For example, the multilayer ceramic capacitor 1 may include a two-portion structure, a three-portion structure, or a four-portion structure as shown in FIGS. 15A, 15B, and 15C.

Figure 15A:
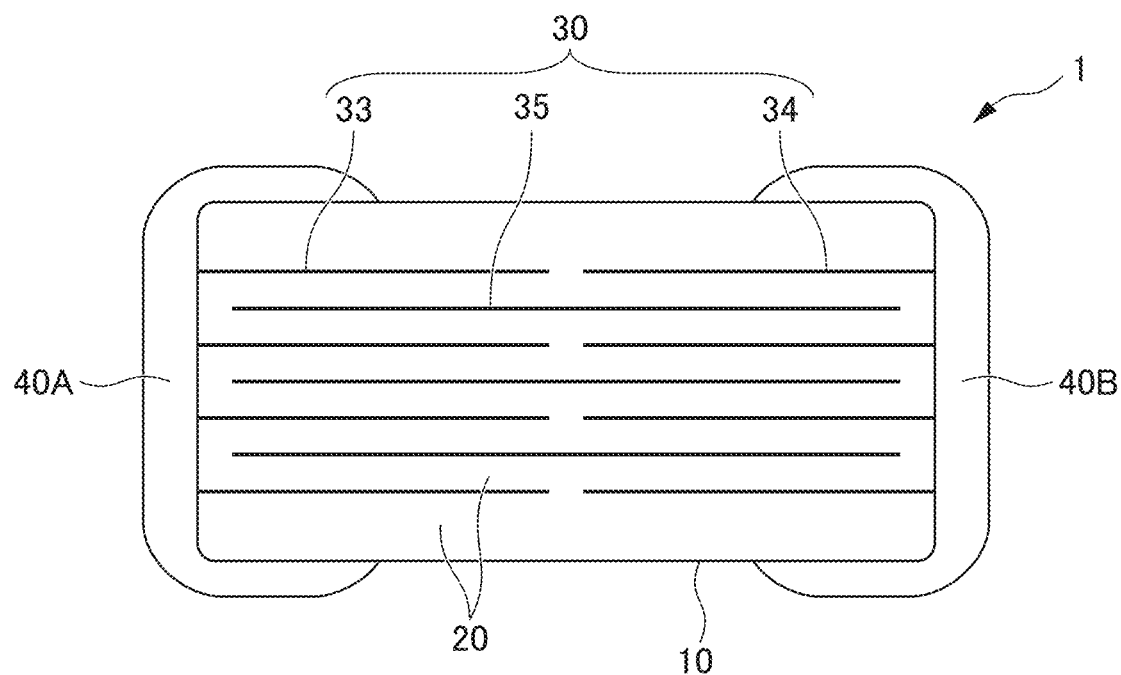
FIG. 15A is a diagram of a multilayer ceramic capacitor including a two-portion structure.
Figure 15B:
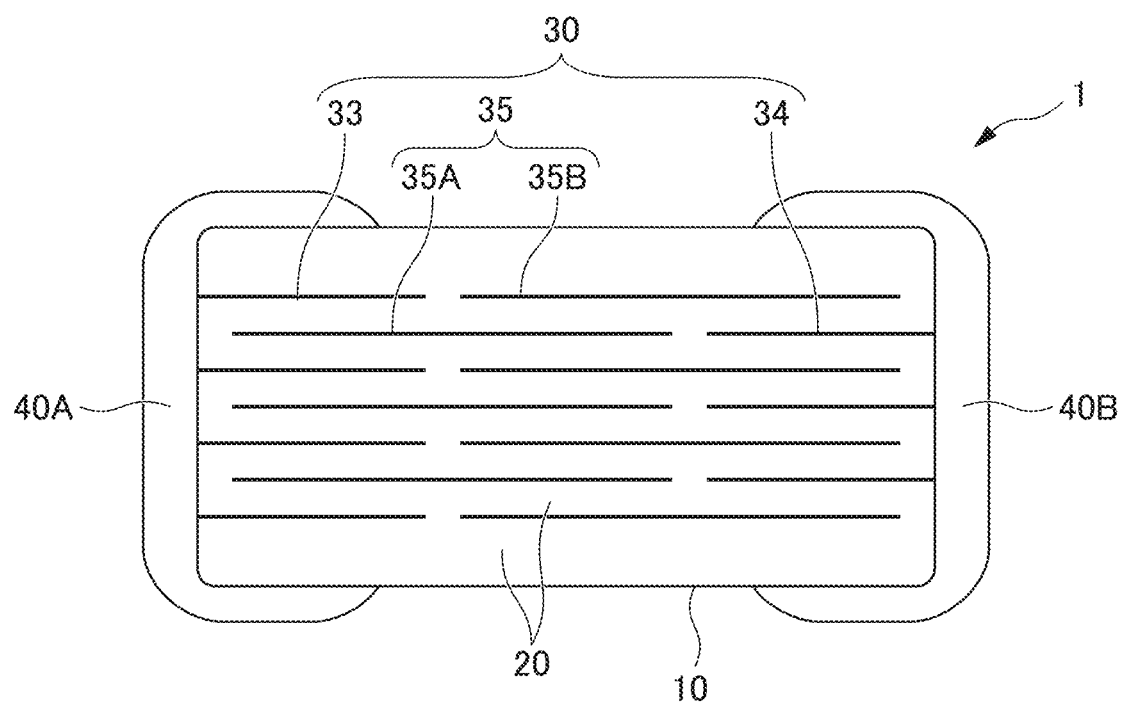
FIG. 15B is a diagram of a multilayer ceramic capacitor including a three-portion structure.
Figure 15C:
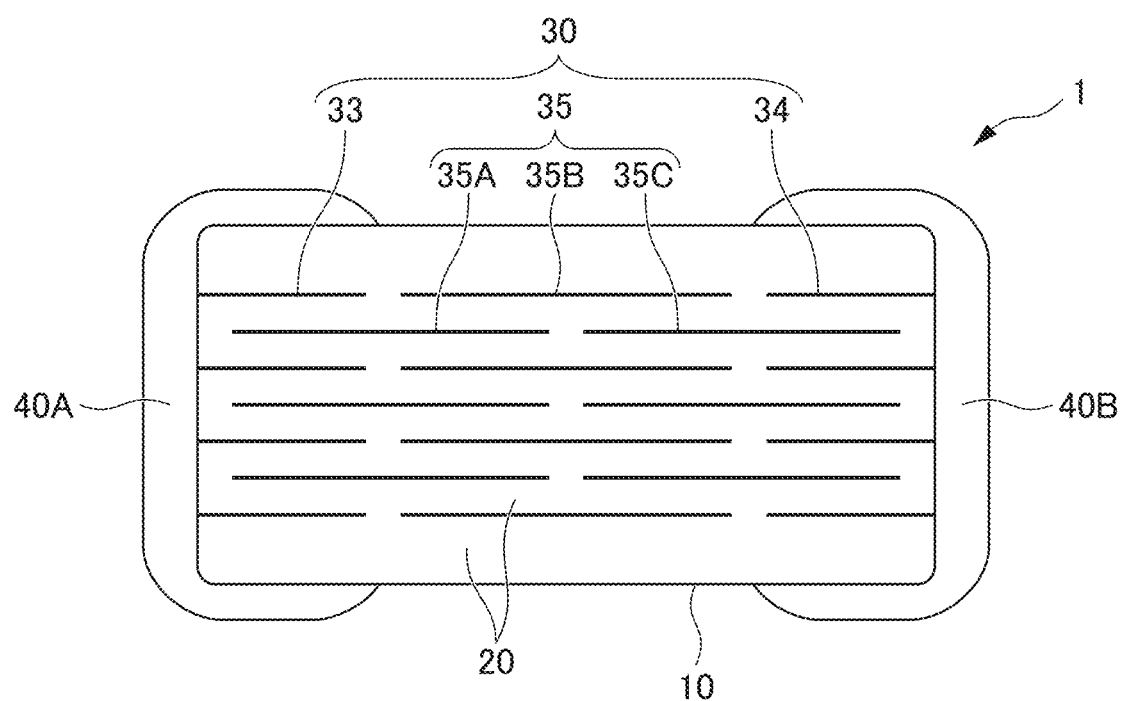
FIG. 15C is a diagram of a multilayer ceramic capacitor including a four-portion structure.

The multilayer ceramic capacitor 1 shown in FIG. 15A is a multilayer ceramic capacitor 1 including a two-portion structure. The multilayer ceramic capacitor 1 includes, as the internal electrode layer 30, a floating internal electrode layer 35 which does not extend to either side of the first end surface LS1 and the second end surface LS2, in addition to the first internal electrode layer 33 and the second internal electrode layer 34. The multilayer ceramic capacitor 1 shown in FIG. 15B includes a three-portion structure including, as the floating internal electrode layer 35, a first floating internal electrode layer 35A and a second floating internal electrode layer 35B. The multilayer ceramic capacitor 1 shown in FIG. 15C includes a four-portion structure including, as the floating internal electrode layer 35, the first floating internal electrode layer 35A, the second floating internal electrode layer 35B and a third floating internal electrode layer 35C. Thus, by providing the floating internal electrode layer 35 as the internal electrode layer 30, the multilayer ceramic capacitor 1 includes a structure in which the opposing electrode portion is divided into a plurality of opposing electrode portions. With such a configuration, a plurality of capacitor components are provided between the opposing internal electrode layers 30, such that a configuration in which these capacitor components are connected in series is provided. Therefore, the voltage applied to the respective capacitor components becomes low, and thus, it is possible to achieve a high breakdown voltage of the multilayer ceramic capacitor 1. The multilayer ceramic capacitor 1 of the present preferred embodiment may be a multiple-portion structure of four or more portions.

The multilayer ceramic capacitor 1 may be a two-terminal multilayer ceramic capacitor including two external electrodes, or may be of a multi-terminal multilayer ceramic capacitor including a large number of external electrodes.

In the preferred embodiment of the present invention described above, the multilayer ceramic capacitor in which the dielectric layers 20 made of dielectric ceramic is used as a ceramic layer is exemplified as the multilayer ceramic electronic component. However, multilayer ceramic electronic components according to preferred embodiments of the present invention are not limited thereto. For example, ceramic electronic components according to preferred embodiments of the present invention are also applicable to piezoelectric components including piezoelectric ceramic as a ceramic layer, and various multilayer ceramic electronic components such as a thermistor including semiconductor ceramic as a ceramic layer. Examples of the piezoelectric ceramic include PZT (lead zirconate titanate) ceramic and the like. Examples of the semiconductor ceramic include spinel ceramic and the like.

According to the multilayer ceramic electronic component of the present preferred embodiment of the present invention, the following advantageous effects are obtained.

(1) The multilayer ceramic electronic component 1 according to the present preferred embodiment of the present invention includes the multilayer body 10 including the plurality of stacked ceramic layers 20, the plurality of internal conductive layers 30 stacked on the ceramic layers 20, the first main surface TS1 and the second main surface TS2 opposing each other in the height direction, the first side surface WS1 and the second side surface WS2 opposing each other in the width direction perpendicular or substantially perpendicular to the height direction, and the first end surface LS1 and the second end surface LS2 opposing each other in the length direction perpendicular or substantially perpendicular to the height direction and the width direction; and the external electrodes 40, each connected to the internal conductive layers 30. The internal conductive layers 30 each include a plurality of holes each having a different shape and a different area equivalent diameter. When an area equivalent diameter in which a cumulative value in a cumulative distribution of area equivalent diameters of the plurality of holes existing in each of the internal conductive layers 30 is about 90% is defined as an area equivalent diameter D90, an average value of circularity of the plurality of holes in a first population including holes each having the area equivalent diameter D90 or more is about 0.7 or less. With such a configuration, it is possible to provide multilayer ceramic electronic components that can reduce or prevent the electric field concentration.

(2) In the multilayer ceramic electronic component 1 according to the present preferred embodiment of the present invention, an average value of circularity of the plurality of holes in a first population including holes each having the area equivalent diameter D90 or more is about 0.46 or less. With such a configuration, the electric field concentration is further reduced.

(3) In the multilayer ceramic electronic component 1 according to the present preferred embodiment of the present invention, an average value of circularity of the plurality of holes in a first population including holes each having the area equivalent diameter D90 or more is about 0.2 or more and about 0.7 or less. With such a configuration, the electric field concentration is further reduced.

(4) In the multilayer ceramic electronic component 1 according to the present preferred embodiment of the present invention, an average value of circularity of the plurality of holes in a first population including holes each having the area equivalent diameter D90 or more is about 0.2 or more and about 0.46 or less. With such a configuration, the electric field concentration is further reduced.

(5) In the multilayer ceramic electronic component 1 according to the present preferred embodiment of the present invention, a coverage of the internal conductive layer 30 with respect to the ceramic layer 20 is about 70% or more and about 99% or less. With such a configuration, it is possible to improve the reliability of the products while reducing or preventing the lowering of the electrostatic capacitance.

(6) In the multilayer ceramic electronic component 1 according to the present preferred embodiment of the present invention, the coverage of the internal conductive layer 30 with respect to the ceramic layer 20 is about 86% or more and about 93% or less. With such a configuration, it is possible to improve the reliability of the products while reducing or preventing the lowering of the electrostatic capacitance.

(7) In the multilayer ceramic electronic component 1 according to the present preferred embodiment of the present invention, the internal conductive layers 30 each include a thickness of about 0.2 μm or more and about 2.0 μm or less. With such a configuration, it is possible to reduce the electric field concentration while using a configuration that easily ensures the capacitance.

(8) In the multilayer ceramic electronic component 1 according to the present preferred embodiment of the present invention, the internal conductive layers 30 each include a thickness of about 0.2 μm or more and about 0.3 μm or less. With such a configuration, it is possible to reduce the electric field concentration while using a configuration that easily ensures the capacitance.

(9) In the multilayer ceramic electronic component 1 according to the present preferred embodiment of the present invention, the area equivalent diameter D90 of the plurality of holes existing in the internal conductive layers 30 is about 4.0 μm or less. With such a configuration, the electric field concentration is further reduced.

(10) In the multilayer ceramic electronic component 1 according to the present preferred embodiment of the present invention, the area equivalent diameter D90 of the plurality of holes existing in the internal conductive layers 30 is about 1.9 μm or more and about 4.0 μm or less. With such a configuration, the electric field concentration is further reduced.

(11) In the multilayer ceramic electronic component 1 according to the present preferred embodiment of the present invention, a thickness of each of the internal conductive layers 30 is smaller than the area equivalent diameter D90. With such a configuration, it is possible to reduce the electric field concentration while using a configuration that easily ensures the capacitance.

(12) In the multilayer ceramic electronic component 1 according to the present preferred embodiment of the present invention, a thickness of each of the internal conductive layers 30 is half or less the area equivalent diameter D90. With such a configuration, it is possible to reduce the electric field concentration while using a configuration that easily ensures the capacitance.

(13) In the multilayer ceramic electronic component 1 according to the present preferred embodiment of the present invention, when an area equivalent diameter in which a cumulative value in a cumulative distribution of area equivalent diameters of the plurality of holes existing in each of the internal conductive layers 30 is about 99% is defined as an area equivalent diameter D99, the area equivalent diameter D99 of the plurality of holes existing in the internal conductive layers 30 is about 8.0 μm or less. With such a configuration, the electric field concentration is further reduced.

(14) In the multilayer ceramic electronic component 1 according to the present preferred embodiment of the present invention, the area equivalent diameter D99 of the plurality of holes existing in the internal conductive layers 30 is about 3.2 μm or less. With such a configuration, the electric field concentration is further reduced.

(15) In the multilayer ceramic electronic component 1 according to the present preferred embodiment of the present invention, the area equivalent diameter D99 of the plurality of holes existing in the internal conductive layers 30 is about 2.0 μm or more and about 8.0 μm or less. With such a configuration, the electric field concentration is further reduced.

(16) In the multilayer ceramic electronic component 1 according to the present preferred embodiment of the present invention, the area equivalent diameter D99 of the plurality of holes existing in the internal conductive layers 30 is about 2.0 μm or more and about 4.0 μm or less. With such a configuration, the electric field concentration is further reduced.

(17) In the multilayer ceramic electronic component 1 according to the present preferred embodiment of the present invention, the multilayer ceramic electronic component 1 according to the present preferred embodiment of the present invention includes the following configuration. The external electrodes 40 include the first external electrode 40A in the vicinity of the first end surface LS1 and the second external electrode 40B in the vicinity of the second end surface LS2. The plurality of internal conductive layers 30 include the plurality of first internal conductive layers 3 which are electrically connected to the first external electrode 40A, and the plurality of second internal conductive layers which are electrically connected to the second external electrode 40B. The first internal conductive layers 31 each include the first side WE1 in the vicinity of the first side surface WS1 and the second side WE2 in the vicinity of the second side surface WS2. The second internal conductive layers 32 each include the third side WE3 in the vicinity of the first side surface WS1 and the fourth side WE4 in the vicinity of the second side surface WS2. In the first internal conductive layers 31, the first region A1 is defined as a region from a position about 10 μm away from the first side WE1 to a position about 50 μm away from the first side WE1, the second region A2 is defined as a region from a position about 10 μm away from the second side WE2 to a position about 50 μm away from the second side WE2, the third region A3 is defined as a region from a position about 10 μm away from the third side to a position about 50 μm away from the third side, the fourth region A4 is defined as a region from a position about 10 μm away from the fourth side to a position about 50 μm away from the fourth side. When the holes existing in the first region A1, the second region A2, the third region A3, and the fourth region A4 are defined as a population of the holes, the area equivalent diameter D90 is an area equivalent diameter in which a cumulative value in a cumulative distribution of the area equivalent diameters of the holes in the population of the holes is about 90%. With such a configuration, it is possible to provide multilayer ceramic electronic components with high reliability that reduce or prevent the electric field concentration.

(18) The multilayer ceramic electronic component 1 according to the present preferred embodiment of the present invention includes the multilayer body 10 including the plurality of stacked ceramic layers 20, the plurality of internal conductive layers 30 stacked on the ceramic layers 20, the first main surface TS1 and the second main surface TS2 opposing each other in the height direction, the first side surface WS1 and the second side surface WS2 opposing each other in the width direction perpendicular or substantially perpendicular to the height direction, and the first end surface LS1 and the second end surface LS2 opposing each other in the length direction perpendicular or substantially perpendicular to the height direction and the width direction, and the external electrodes 40 each connected to the internal conductive layers 30. The internal conductive layers each include a plurality of holes each having a different shape and a different area equivalent diameter. The external electrodes 40 include the first external electrode 40A in the vicinity of the first end surface LS1 and the second external electrode 40B in the vicinity of the second end surface LS2. The plurality of internal conductive layers 30 include the plurality of first internal conductive layers 3 which are electrically connected to the first external electrode 40A, and the plurality of second internal conductive layers which are electrically connected to the second external electrode 40B. The first internal conductive layers 31 each include the first side WE1 in the vicinity of the first side surface WS1 and the second side WE2 in the vicinity of the second side surface WS2. The second internal conductive layers 32 each include the third side WE3 in the vicinity of the first side surface WS1 and the fourth side WE4 in the vicinity of the second side surface WS2. In the first internal conductive layers 31, the first region A1 is defined as a region from a position about 10 μm away from the first side WE1 to a position about 50 μm away from the first side WE1, the second region A2 is defined as a region from a position about 10 μm away from the second side WE2 to a position about 50 μm away from the second side WE2, the third region A3 is defined as a region from a position about 10 μm away from the third side to a position about 50 μm away from the third side, the fourth region A4 is defined as a region from a position about 10 μm away from the fourth side to a position about 50 μm away from the fourth side. When the holes existing in the first region A1, the second region A2, the third region A3, and the fourth region A4 are defined as a population of the holes, and when the area equivalent diameter D90 is defined as an area equivalent diameter in which a cumulative value in a cumulative distribution of the area equivalent diameters of the holes in the population of the holes is about 90%, the average value of circularity of the plurality of holes in the first population including the holes each having the area equivalent diameter D90 or more among the population of the holes, is about 0.7 or less. With such a configuration, it is possible to provide multilayer ceramic electronic components with high reliability that reduce or prevent electric field concentration.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a multilayer body including a plurality of stacked ceramic layers, a plurality of internal conductive layers stacked on the ceramic layers, a first main surface and a second main surface opposing each other in a height direction, a first side surface and a second side surface opposing each other in a width direction perpendicular or substantially perpendicular to the height direction, and a first end surface and a second end surface opposing each other in a length direction perpendicular or substantially perpendicular to the height direction and the width direction; and
    external electrodes each connected to the internal conductive layers; wherein
    the plurality of internal conductive layers each include a plurality of holes, each having a different shape and a different area equivalent diameter;
    when an area equivalent diameter in which a cumulative value in a cumulative distribution of area equivalent diameters of the plurality of holes existing in each of the internal conductive layers is about 90% is defined as an area equivalent diameter D90, an average value of circularity of the plurality of holes in a first population including holes each having the area equivalent diameter D90 or more is about 0.7 or less.

2. The multilayer ceramic electronic component according to claim 1, wherein an average value of circularity of the plurality of holes in the first population including holes each having the area equivalent diameter D90 or more is about 0.46 or less.

3. The multilayer ceramic electronic component according to claim 1, wherein an average value of circularity of the plurality of holes in the first population including holes, each having the area equivalent diameter D90 or more, is about 0.2 or more and about 0.7 or less.

4. The multilayer ceramic electronic component according to claim 1, wherein an average value of circularity of the plurality of holes in the first population including holes, each having the area equivalent diameter D90 or more, is about 0.2 or more and about 0.46 or less.

5. The multilayer ceramic electronic component according to claim 1, wherein a coverage of each of the plurality of internal conductive layers with respect to each of the ceramic layers is about 70% or more and about 99% or less.

6. The multilayer ceramic electronic component according to claim 1, wherein a coverage of each of the plurality of internal conductive layers with respect to each of the ceramic layers is about 86% or more and about 93% or less.

7. The multilayer ceramic electronic component according to claim 1, wherein the internal conductive layers each have a thickness of about 0.2 μm or more and about 2.0 μm or less.

8. The multilayer ceramic electronic component according to claim 1, wherein the plurality of internal conductive layers each have a thickness of about 0.2 μm or more and about 0.3 μm or less.

9. The multilayer ceramic electronic component according to claim 1, wherein the area equivalent diameter D90 is about 4.0 μm or less.

10. The multilayer ceramic electronic component according to claim 1, wherein the area equivalent diameter D90 is about 1.9 μm or more and about 4.0 μm or less.

11. The multilayer ceramic electronic component according to claim 1, wherein a thickness of each of the plurality of internal conductive layers is smaller than the area equivalent diameter D90.

12. The multilayer ceramic electronic component according to claim 1, wherein a thickness of each of the plurality of internal conductive layers is no more than about half of the area equivalent diameter D90.

13. The multilayer ceramic electronic component according to claim 1, wherein a dimension of the multilayer body in the length direction is about 0.2 mm or more and about 6 mm or less, a dimension of the multilayer body in the height direction is about 0.05 mm or more and about 5 mm or less, and a dimension of the multilayer body in the width direction is about 0.1 mm or more and about 5 mm or less.

14. The multilayer ceramic electronic component according to claim 1, wherein the multilayer body includes an inner layer portion, a first main surface-side outer layer portion and a second main surface-side outer layer sandwiching the inner layer portion in the height direction.

15. The multilayer ceramic electronic component according to claim 14, wherein
    the inner layer portion includes a plurality of the dielectric layers and the plurality of the internal conductive layers; and
    each of the first and second main surface-side outer layer portions includes a plurality of the dielectric layers.

16. The multilayer ceramic electronic component according to claim 1, wherein each of the plurality of dielectric layers includes $BaTiO_3$, $CaTiO_3$, $SrTiO_3$, or $CaZrO_3$ as a main component.

17. The multilayer ceramic electronic component according to claim 16, wherein each of the plurality of dielectric layers includes Mn compound, an Fe compound, a Cr compound, a Co compound, or a Ni compound as a subcomponent.

18. The multilayer ceramic electronic component according to claim 1, wherein each of the plurality of dielectric layers has a thickness of about 0.2 μm or more and about 10 μm or less.

19. The multilayer ceramic electronic component according to claim 1, wherein a number of the plurality of dielectric layers is 15 or more and 1200 or less.

* * * * *